(12) United States Patent
Van Manen et al.

(10) Patent No.: US 10,690,793 B2
(45) Date of Patent: Jun. 23, 2020

(54) SIMULTANEOUS SOURCE ACQUISITION AND SEPARATION ON GENERAL RELATED SAMPLING GRIDS

(71) Applicant: SEISMIC APPARITION GmbH, Zurich (CH)

(72) Inventors: Dirk-Jan Van Manen, Otelfingen (CH); Fredrik Andersson, Esloev (SE); Johan Robertsson, Wald (CH); Kurt Eggenberger, Maienfeld (CH)

(73) Assignee: SEISMIC APPARITION GmbH, Zurich (CH)

( * ) Notice: Subject to any disclaimer, the term of this patent is extended or adjusted under 35 U.S.C. 154(b) by 0 days.

(21) Appl. No.: 16/185,069

(22) Filed: Nov. 9, 2018

(65) Prior Publication Data

US 2019/0079205 A1   Mar. 14, 2019

Related U.S. Application Data

(63) Continuation of application No. PCT/IB2017/052667, filed on May 8, 2017.

(30) Foreign Application Priority Data

May 12, 2016  (GB) .................................. 1608297.6
Nov. 10, 2016 (GB) .................................. 1619036.5

(51) Int. Cl.
*G01V 1/32* (2006.01)
*G01V 1/00* (2006.01)
*G01V 1/36* (2006.01)

(52) U.S. Cl.
CPC .............. *G01V 1/325* (2013.01); *G01V 1/005* (2013.01); *G01V 1/364* (2013.01); *G01V 2210/1293* (2013.01); *G01V 2210/44* (2013.01)

(58) Field of Classification Search
CPC ........ G01V 1/325; G01V 1/005; G01V 1/364; G01V 2210/1293; G01V 2210/44
(Continued)

(56) References Cited

U.S. PATENT DOCUMENTS 4,628,492 A * 12/1986 Winney .................... G01V 1/32
                                                          367/43
6,545,944 B2   4/2003 de Kok
(Continued)

FOREIGN PATENT DOCUMENTS

WO    WO 01/71385 A1    9/2001
WO    WO 2015/036554 A2 3/2015
WO    WO 2016/023598 A1 2/2016

OTHER PUBLICATIONS

International Search Report and Written Opinion of the International Searching Authority dated Jul. 21, 2017, in PCT/IB2017/052667.
(Continued)

*Primary Examiner* — Daniel L Murphy
(74) *Attorney, Agent, or Firm* — Oblon, McClelland, Maier & Neustadt, L.L.P.

(57) ABSTRACT

Methods are described for separating the unknown contributions of two or more sources from a commonly acquired set of wavefield signals representing a wavefield where the sources traverse general, related activation lines or grids and are synchronously activated while varying at least one parameter between the sources.

20 Claims, 18 Drawing Sheets

(58) Field of Classification Search
USPC .......................................................... 367/21
See application file for complete search history.

(56) References Cited

U.S. PATENT DOCUMENTS

| | | | |
|---|---|---|---|
| 9,158,016 B2* | 10/2015 | Chiu | ........................ G01V 1/36 |
| 2010/0161235 A1 | 6/2010 | Ikelle | |
| 2013/0135965 A1 | 5/2013 | Ji et al. | |
| 2014/0278119 A1 | 9/2014 | Halliday et al. | |
| 2014/0355379 A1 | 12/2014 | Moldoveanu et al. | |

OTHER PUBLICATIONS

Nick Moldoveanu et al., "Multivessel coil shooting acquisition with simultaneous sources" Seg Technical Program Expanded Abstracts 2012, Oct. 25, 2012, pp. 1-6, ZP055127792.

A. Papoulis, Generalized sampling expansion. IEEE Transactions on Circuits and Systems, vol. Cas-24, No. 11, Nov. 1977, pp. 652-654.

Xu et al., Antileakage Fourier transform for seismic data regularization. Geophysics vol. 70, No. 4, (Jul.-Aug. 2005); pp. V87-V95.

Shannon, C.E., "Communication in the Presence of Noise", Proceedings of the I.R.E., vol. 37, Jan. 1949, pp. 10-21.

Nyquist, H., "Certain Topics in Telegraph Transmission Theory", Transactions A.I.E.E., Feb. 1928, pp. 617-644.

Ikelle, L.T., "Coding and Decoding: Seismic Data: The Concept of Multishooting", Handbook of Geophysical Exploration: Seismic Exploration, Elsevier, vol. 39, 2010, pp. 293-294, 321-324, 337 and 341.

Abma, R., et al., "Independent Simultaneous Source Acquisition and Processing", Geophysics, vol. 80 No. 6, Nov.-Dec. 2015, pp. WD37-WD44.

Kumar, R., et al., "Source Separation for Simultaneous Towed-Streamer Marine Acquisition—A Compressed Sensing Approach", Geophysics, vol. 80 No. 6, Nov.-Dec. 2015, pp. WD73-WD88.

Mueller, M.B., et al., "The Benefit of Encoded Source Sequences for Simultaneous Source Separation", Geophysics, vol. 80 No. 5, Sep.-Oct. 2015, pp. VI33-VI43.

Robertsson, J.O.A., et al., "Tools and Techniques: Marine Seismic Methods", Geophysics, $2^{nd}$ Edition, vol. 11. Oxford: Elsevier; 2015, pp. 175-208.

Bracewell, R., "The Fourier Transform & Its Applications", McGraw-Hill Science, 1999, pp. 111-115, and 268-269.

Barnes, A.E., "Another look at NMO Stretch", Geophysics, vol. 57 No. 5, May 1992, pp. 749-751.

Stockwell, R.G., et al., "Localization of the Complex Spectrum: The S Transform", IEEE Transactions on Signal Processing, vol. 44 No. 4, Apr. 1996, pp. 998-1001.

Dragoset, B., et al., "Geophysical Application of Adaptive-Noise Cancellation", $65^{th}$ SEG meeting, Expanded Abstracts, 1995, pp. 1389-1392.

Trickett, S.R., "Stretch-free Stacking", SEG Annual Meeting, Society of Exploration Geophysicists, 2003, 4 pages.

Zhang, B., et al., "Nonstretching NMO correction of prestack time-migrated gathers using a matching-pursuit algorithm", Geophysics, vol. 78 No. 1, Jan.-Feb. 2013, pp. U9-U18.

* cited by examiner

Fig. 1A
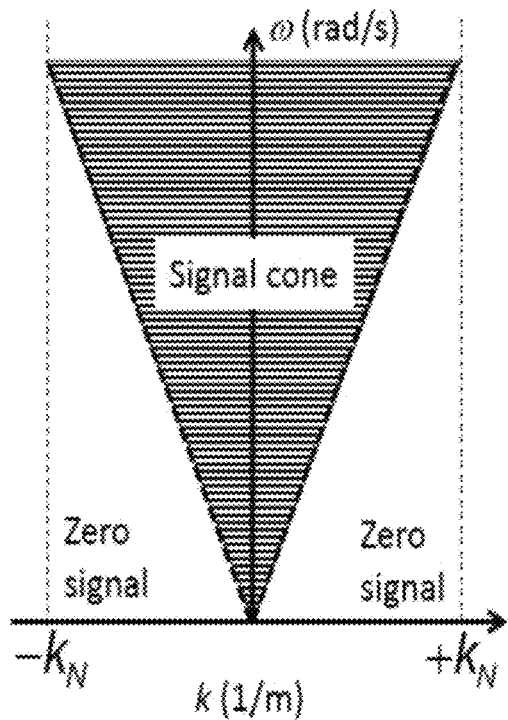
Fig. 1B
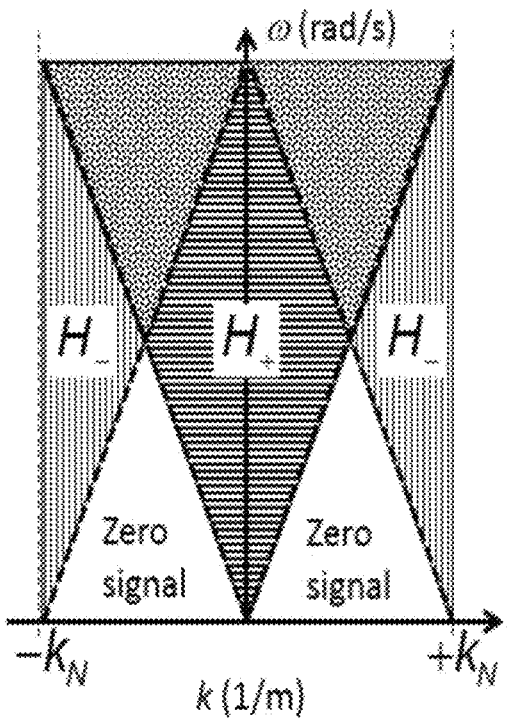
Fig. 2
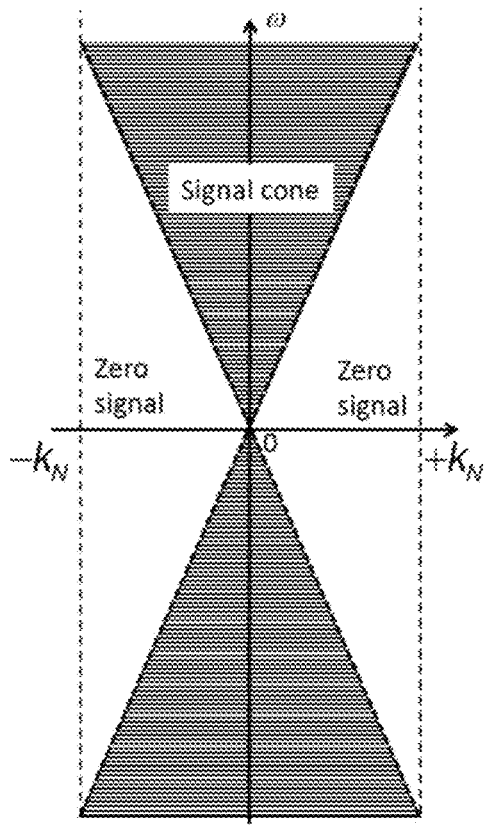
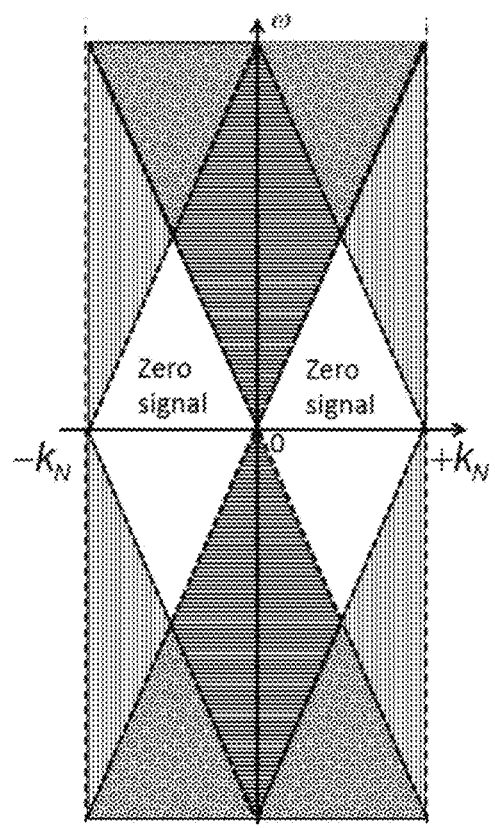

Fig. 4
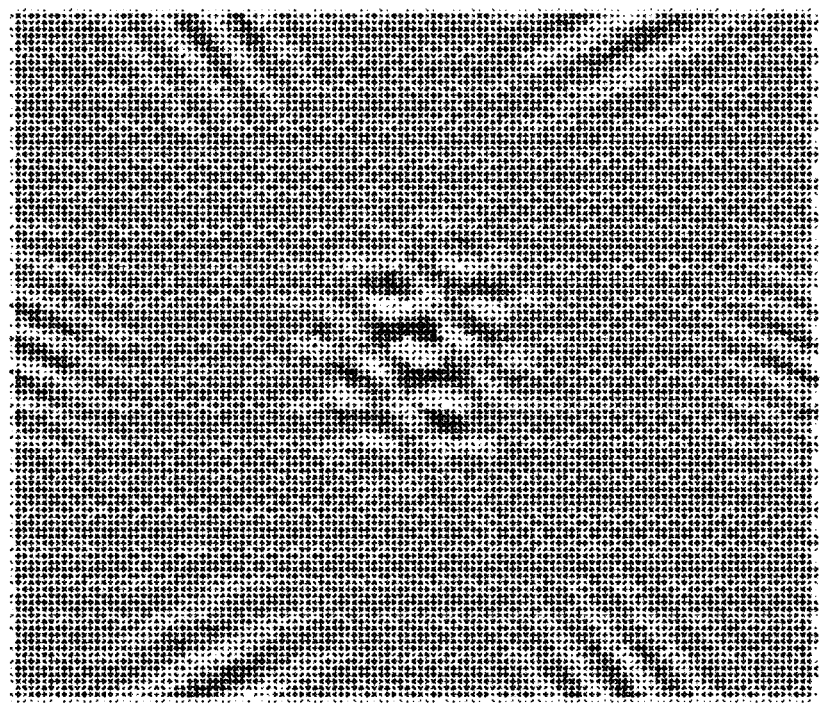
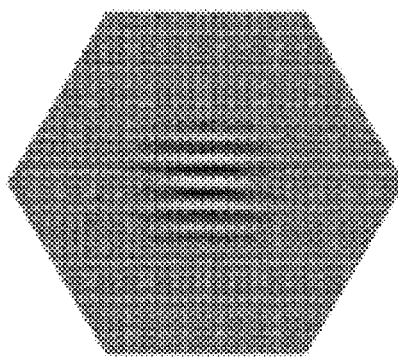 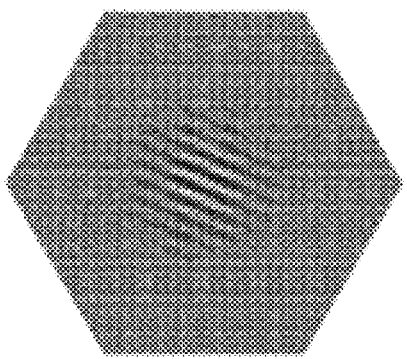
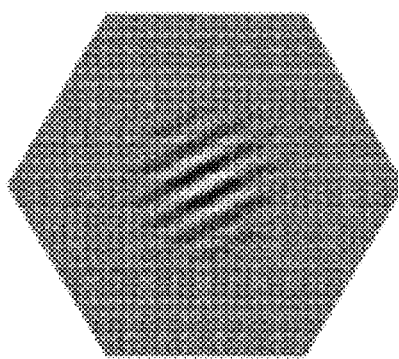 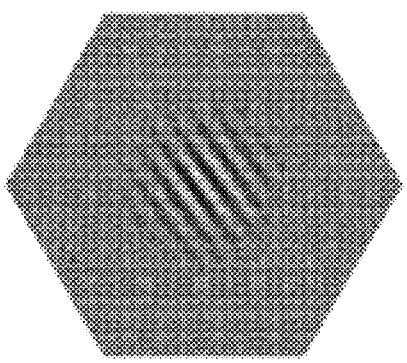

SIMULTANEOUS SOURCE ACQUISITION AND SEPARATION ON GENERAL RELATED SAMPLING GRIDS

CROSS-REFERENCE TO RELATED APPLICATIONS

This application is a continuation of PCT Application No. PCT/IB2017/052667, filed May 8, 2017, which claims priority to Great Britain Application No. 1608297.6, filed May 12, 2016, and Great Britain Application No. 1619036.5, filed Nov. 10, 2016. The entire contents of the above-identified applications are incorporated herein by reference.

FIELD

The present disclosure relates to methods for acquiring and separating contributions from two or more different simultaneously emitting sources in a common set of measured signals representing a wavefield where the sources traverse general, related sampling grids. In particular, the present invention relates to acquiring and separating contributions from two or more different simultaneously emitting seismic sources traversing general, related sampling grids and separating sets of recorded and/or processed seismic signals.

DESCRIPTION OF RELATED ART

The current disclosure relates to marine seismic surveying, including in particular marine seismic data acquisition. The general practice of marine seismic surveying is described below in relation to FIG. 18.

Prospecting for subsurface hydrocarbon deposits (1801) in a marine environment (FIG. 18) is routinely carried out using one or more vessels (1802) towing seismic sources (1803-1805). The one or more vessels can also tow receivers or receivers (1806-1808) can be placed on the seabed (1814).

Seismic sources typically employ a number of so-called airguns (1809-1811) which operate by repeatedly filling up a chamber in the gun with a volume of air using a compressor and releasing the compressed air at suitable chosen times (and depth) into the water column (1812).

The sudden release of compressed air momentarily displaces the seawater, imparting its energy on it, setting up an impulsive pressure wave in the water column propagating away from the source at the speed of sound in water (with a typical value of around ~1500 m/s) (1813).

Upon incidence at the seafloor (or seabed) (1814), the pressure wave is partially transmitted deeper into the subsurface as elastic waves of various types (1815-1817) and partially reflected upwards (1818). The elastic wave energy propagating deeper into the subsurface partitions whenever discontinuities in subsurface material properties occur. The elastic waves in the subsurface are also subject to an elastic attenuation which reduces the amplitude of the waves depending on the number of cycles or wavelengths.

Some of the energy reflected upwards (1820-1821) is sensed and recorded by suitable receivers placed on the seabed (1806-1808), or towed behind one or more vessels. The receivers, depending on the type, sense and record a variety of quantities associated with the reflected energy, for example, one or more components of the particle displacement, velocity or acceleration vector (using geophones, mems [micro-electromechanical] or other devices, as is well known in the art), or the pressure variations (using hydrophones). The wave field recordings made by the receivers are stored locally in a memory device and/or transmitted over a network for storage and processing by one or more computers.

Waves emitted by the source in the upward direction also reflect downward from the sea surface (1819), which acts as a nearly perfect mirror for acoustic waves.

One seismic source typically includes one or more airgun arrays (1803-1805): that is, multiple airgun elements (1809-1811) towed in, e.g., a linear configuration spaced apart several meters and at substantially the same depth, whose air is released (near-) simultaneously, typically to increase the amount of energy directed towards (and emitted into) the subsurface.

Seismic acquisition proceeds by the source vessel (1802) sailing along many lines or trajectories (1822) and releasing air from the airguns from one or more source arrays (also known as firing or shooting) once the vessel or arrays reach particular pre-determined positions along the line or trajectory (1823-1825), or, at fixed, pre-determined times or time intervals. In FIG. 18, the source vessel (1802) is shown in three consecutive positions (1823-1825), also called shot positions.

Typically, subsurface reflected waves are recorded with the source vessel occupying and shooting hundreds of shots positions. A combination of many sail-lines (1822) can form, for example, an areal grid of source positions with associated inline source spacings (1826) and crossline source spacings. Receivers can be similarly laid out in one or more lines forming an areal configuration with associated inline receiver spacings (1827) and crossline receiver spacings.

A common and long-standing problem in physical wavefield experimentation is how to separate recorded signals from two or more simultaneously emitting sources. In particular, for more than a decade, the simultaneous source problem has (arguably) been the most pertinent problem to solve to efficiently acquire data for 3D reflection seismic imaging of complex Earth subsurface structures.

Simultaneously emitting sources, such that their signals overlap in the (seismic) record, is also known in the industry as "blending". Conversely, separating signals from two or more simultaneously emitting sources is also known as "deblending". And the data from such acquisitions as "blended data". Halliday et al. (2014) describe methods for simultaneous source acquisition relying on highly-controlled marine vibroseis records.

Modern digital data processing of wavefields (or signals) uses a discretized version of the original wavefield, say g, that is obtained by sampling g on a discrete set. The Nyquist-Shannon sampling theorem shows how g can be recovered from its samples; for an infinite number of equidistant samples and given sample rate $k_s$, perfect reconstruction is guaranteed provided that the underlying signal was bandlimited to $|k| \le k_N = k_s/2$ (Shannon, 1949; Nyquist, 1928), where $k_N$ is the so-called Nyquist wavenumber. The Nyquist-Shannon sampling theorem is equally relevant both to signals generated from a single source being recorded on multiple receivers (receiver-side sampling) as well as signals generated from multiple sources and recorded at a single receiver (source-side sampling).

Assume that the wavefield g is measured at a specific recording location for a source that is excited at different source positions along a straight line. The sampling theorem then dictates how the source locations must be sampled for a given frequency of the source and phase velocity of the wavefield. One aspect of the sampling problem is as follows. Consider that instead of using one source, one wants to use two (or more) sources to for instance increase the rate at which data can be acquired. The second source is triggered simultaneously or close in time with the first source while moving along another arbitrarily oriented line to excite the wavefield h. At the recording location the wavefields interfere and the sum of the two wavefields, f=g+h, is measured. There is no known published exact solution to perfectly separate the wavefields g and h that were produced from each source from the combined measurement f (e.g., see Ikelle, 2010; Abma et al., 2015; Kumar et al, 2015; Mueller et al., 2015).

It may therefore be seen as an object of the invention, to present new and/or improved methods for acquiring and separating simultaneous-source data, particularly, including methods that accommodate and can exploit sources acquired on general but related sampling grids to increase the efficiency and/or the quality with which sources can be simultaneously acquired and separated.

SUMMARY

Methods for separating or deblending wavefields generated by two or more sources contributing to a common set of measured or recorded signals are provided, where the sources have traversed general, related sampling grids, suited for seismic applications and other purposes, substantially as shown in and/or described in connection with at least one of the figures, and as set forth more completely in the claims.

Advantages, aspects and novel features of the present inventions, as well as details of an illustrated embodiment thereof, may be more fully understood from the following description and drawings.

BRIEF DESCRIPTION OF THE DRAWINGS

In the following description reference is made to the attached figures, in which:

FIGS. 1A and 1B illustrate how in a conventional marine seismic survey all signal energy of two source typically sits inside a "signal cone" (horizontally striped) bounded by the propagation velocity of the recording medium and how this energy can be split in a transform domain by applying a modulation to the second source;

FIG. 2 is the function $D_1(\omega, \xi)$ from Eq. (3) for a set of apparition blended synthetic data with noise. The left panel shows horizontally striped the region described by Eq. (1), while the horizontally striped part in the center of the right panel shows the diamond shaped conditions Eq. (4), and the aliasing/mixing effects from Eqs. (3) and (5) is highlighted by speckles/dots;

FIG. 4 (top panel) contains blended data in the Fourier domain and the lower panel the recovered four functions;

DETAILED DESCRIPTION

Figure 3:
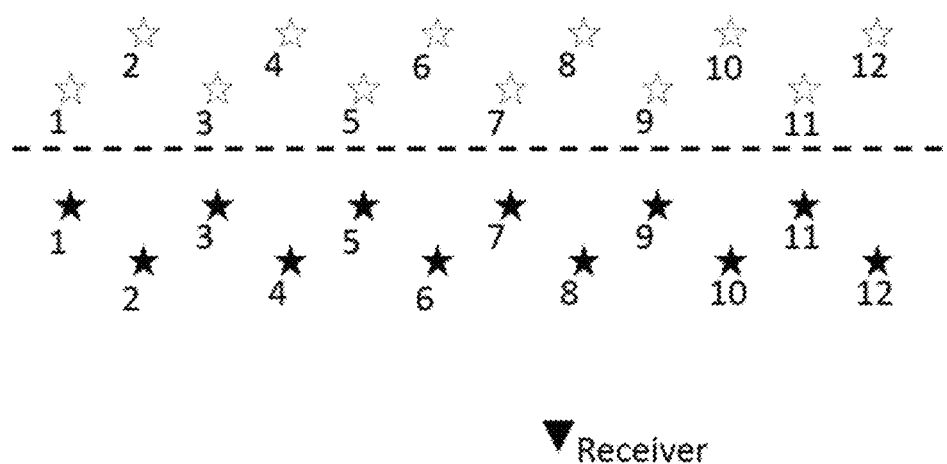
FIG. 3 shows the effect of the source ghost when acquiring a data with varying source depths can be thought of as ghost sources (open white stars) excited at mirror locations across the sea surface with opposite polarity compared to the true sources (solid black stars), where the responses due to the open white stars represents the deghosted the data on the source side.

The following examples may be better understood using a theoretical overview as presented below.

The slowest observable (apparent) velocity of a signal along a line of recordings in any kind of wave experimentation is identical to the slowest physical propagation velocity in the medium where the recordings are made. As a result, after a spatial and temporal Fourier transform, large parts of the frequency-wavenumber ($\omega k$) spectrum inside the Nyquist frequency and wavenumber tend to be empty. In particular, for marine reflection seismic data (Robertsson et al., 2015), the slowest observable velocity of arrivals corresponds to the propagation velocity in water (around 1500 m/s).

FIG. 1A illustrates how all signal energy when represented in or transformed into the frequency-wavenumber ($\omega k$) domain sits inside a "signal cone" centered at k=0 and bounded by the propagation velocity of the recording medium.

It is well known, for example, that due to the "uncertainty principle", a function and its Fourier transform cannot both have bounded support. As (seismic) data are necessarily acquired over a finite spatial (and temporal) extent, the terms "bounded support" and "limited support" herein are used not in the strict mathematical sense, but rather to describe an "effective numerical support", that can be characterised, e.g., by the (amplitude) spectrum being larger than a certain value. For instance, larger than a certain noise threshold, or larger than the quantization error of the analog-to-digital converters used in the measurement equipment. Further, it is understood that by explicitly windowing space and/or space-time domain data, the support of a function may be spread over a larger region of, e.g., the wavenumber-frequency domain and in such cases the term "bounded support" and "limited support" will also be understood as "effective numerical support" as it will still be possible to apply the methods described herein.

Furthermore, the terms "cone" and "cone-shaped" used herein are used to indicate the shape of the "bounded" or "effective numerical" support of the data of interest (e.g., the data that would be recorded firing the sources individually [i.e. non-simultaneously]) in the frequency-wavenumber domain. In many cases, it will still be possible to apply the methods described herein if the actual support is approximately conic or approximately cone-shaped. For example, at certain frequencies or across certain frequency ranges the support could be locally wider or less wide than strictly defined by a cone. Such variations are contemplated and within the scope of the appended claims. That is, the terms "cone" and "cone-shaped" should be understood to include approximately conic and approximately cone-shaped. In addition, in some cases we use the terms "bounded support" or "limited support" and "effective numerical support" to refer to data with "conic support" or "cone-shaped support" even though in the strict mathematical sense a "cone" is not bounded (as it extends to infinite temporal frequency). In such cases, the "boundedness" should be understood to refer to the support of the data along the wavenumber axis/axes, whereas "conic" refers to the overall shape of the support in the frequency-wavenumber domain.

Note that the term "cone-shaped support" or similar refers to the shape of the support of e.g. the data of interest (in the frequency-wavenumber domain), if it were regularly sampled along a linear trajectory in 2D or Cartesian grid in 3D. That is, it refers only to the existence of such a support and not to the actual observed support of the data of interest in the simultaneous source input data or of the separated data of interest sampled as desired. The support of both of these depends on the chosen regularly or irregularly sampled straight or curved input (activation) and output (separation) lines or grids. Such variations are within the scope of the appended claims.

For example consider a case where the input data are acquired using simultaneous curved shot lines. In this case, the methods described herein can either be applied directly to the input data, provided the curvature has not widened the support of the data interest such that it significantly overlaps with itself. In this case, the support used in the methods described herein can be different from cone-shaped. Alternatively, the methods described herein are used to reconstruct the data of interest in a transform domain which corresponds to, e.g., best-fitting regularly sampled and/or straight activation lines or Cartesian grids, followed by computing the separated data of interest in the non-transformed domain at desired regular or irregularly sampled locations.

In a wavefield experiment it may be that a source is excited sequentially for multiple source locations along a line while recording the reflected wavefield on at least one receiver. The source may be characterized by its temporal signature. In the conventional way of acquiring signals representing a wavefield the source may be excited using the same signature from source location to source location, denoted by integer n. Next, consider the alternative way of acquiring such a line of data using a periodic sequence of source signatures: every second source may have a constant signature and every other second source may have a signature which can for example be a scaled or filtered function of the first source signature. Let this scaling or convolution filter be denoted by a(t), with frequency-domain transform $A(\omega)$. Analyzed in the frequency domain, using for example a receiver gather (one receiver station measuring the response from a sequence of sources) recorded in this way, can be constructed from the following modulating function m(n) applied to a conventionally sampled and recorded set of wavefield signals:

$$m(n) = \frac{1}{2}[1 + (-1)^n] + \frac{1}{2}A[1 - (-1)^n],$$

which can also be written as $$m(n) = \frac{1}{2}[1 + e^{i\pi n}] + \frac{1}{2}A[1 - e^{i\pi n}]. \quad (0.1)$$

By applying the function m in Eq. 0.1 as a modulating function to data f(n) before taking a discrete Fourier transform in space (over n), $F(k) = \mathcal{F}(f(n))$, the following result can be obtained:

$$\mathcal{F}(f(n)m(n)) = \frac{1+A}{2}F(k) + \frac{1-A}{2}F(k - k_N), \quad (0.2)$$

which follows from a standard Fourier transform result (wavenumber shift) (Bracewell, 1999).

Eq. 0.2 shows that the recorded data f will be scaled and replicated into two places in the spectral domain as illustrated in FIG. 1B and as quantified in Tab. I for different choices of $A(\omega)$.

TABLE I

Mapping of signal to cone centered at $k = 0$ ($H_+$) and cone centered at $k = k_N$ ($H_-$) for different choices of A ($\omega$) for signal separation or signal apparition in Eq. (0.2).

| $A(\omega)$ | $H_- = (1 - A)/2$ | $H_+ = (1 + A)/2$ |
| --- | --- | --- |
| 1 | 0 | 1 |
| -1 | 1 | 0 |
| 0 | ½ | ½ |
| ½ | ¼ | ¾ |
| $e^{i\omega T}$ | $(1 - e^{i\omega T})/2$ | $(1 + e^{i\omega T})/2$ |
| $1 + e^{i\omega T}$ | $-e^{i\omega T}/2$ | $1 + e^{i\omega T}/2$ |

Part of the data will remain at the signal cone centered around k=0 (denoted by $H_+$ in FIG. 1B) and part of the data will be scaled and replicated to a signal cone centered around $k_N$ (denoted by $H_-$). It can be observed that by only knowing one of these parts of the data it is possible to predict the other.

This process may be referred to as "wavefield apparition" or "signal apparition" in the meaning of "the act of becoming visible". In the spectral domain, the wavefield caused by the periodic source sequence is nearly "ghostly apparent" and isolated.

A particular application of interest that can be solved by using the result in Eq. (0.2) is that of simultaneous source separation. Assume that a first source with constant signature is moved along an essentially straight line with uniform sampling of the source locations where it generates the wavefield g. Along another essentially straight line a second source is also moved with uniform sampling. Its signature is varied for every second source location according to the simple deterministic modulating sequence m(n), generating the wavefield h. The summed, interfering data f=g+h are recorded at a receiver location.

In the frequency-wavenumber domain, where the recorded data are denoted by F=G+H, the H-part is partitioned into two components $H_+$ and $H_-$ with $H=H_++H_-$ where the $H_-$-component is nearly "ghostly apparent" and isolated around the Nyquist-wavenumber [FIG. 1B], whereas G and $H_+$ are overlapping wavefields around k=0. Furthermore, $H_-$ is a known, scaled function of H. The scaling depends on the chosen $A(\omega)$ function (Tab. I), and can be deterministically removed, thereby producing the full appearance of the transformed wavefield H. When H is found, then G=F−H yielding the separate wavefields g and h in the time-space domain.

Although the above description has focused on acquisition along essentially straight lines, the methodology applies equally well to curved trajectories such as coil-shaped trajectories, circles, or other smoothly varying trajectories or sequences of source activations.

The concept may be extended to the simultaneous acquisition of more than two source lines by choosing different modulation functions for each source.

Acquiring a source line where the first two source locations have the same signature, followed by two again with the same signature but modified from the previous two by the function $A(\omega)$ and then repeating the pattern again until the full source line has been acquired, will generate additional signal cones centered around $\pm k_N/2$.

FIG. 1B also illustrates a possible limitation of signal apparition. The $H_+$ and $H_-$ parts are separated within the respective lozenge-shaped regions in FIG. 1B. In the triangle-shaped parts they interfere and may no longer be separately predicted without further assumptions. In the example shown in FIG. 1B, it can therefore be noted that the maximum non-aliased frequency for a certain spatial sampling is reduced by a factor of two after applying signal apparition. Assuming that data are adequately sampled, the method nevertheless enables full separation of data recorded in wavefield experimentation where two source lines are acquired simultaneously.

As is evident from Tab. I, the special case A=1 corresponds to regular acquisition and thus produces no signal apparition. Obviously, it is advantageous to choose A significantly different from unity so that signal apparition becomes significant and above noise levels. The case where A=−1 (acquisition of data where the source signature flips polarity between source locations) may appear to be the optimal choice as it fully shifts all energy from k=0 to $k_N$ (Bracewell, 1999). Although this is a valid choice for modeling, it is not practical for many applications (e.g., for marine air gun sources, see Robertsson et al., 2015 as it requires the ability to flip polarity of the source signal. The case where A=0 (source excited every second time only) may be a straightforward way to acquire simultaneous source data but has the limitation of reduced sub-surface illumination. A particularly attractive choice of $A(\omega)$ for wave experimentation seems to let every second source be excited a time shift T later compared to neighbouring recordings, that is, select $A=e^{i\omega t}$.

The above description assumes a simple modulating sequence m(n), and thus generating the wavefield h. In practice it is difficult to obtain perfectly periodic time shifts from a measurement setup. It is for example common practice for seismic vessels to shoot or trigger their sources at predetermined (essentially equidistant) positions, and due to practical variations (vessel velocity etc.) it will be difficult to realize shots at both predetermined locations and times.

Deviations from perfectly periodic acquisition can be termed non-periodic and grouped into non-periodic controlled (or intentional) and non-periodic uncontrolled cases (such as caused by currents, rough seas, etc., which are beyond influence by the acquisition crew). Furthermore, non-periodic acquisition can be composed of a periodic part, overlain by a non-periodic part. In all these cases, the signal cone will be scaled and replicated additional times along the wavenumber axis and the effects can be dealt with by various methods, including modelling and inverting such scaled replications using cyclic convolution functions as described in more detail later.

Note that periodic or aperiodic variations in source locations can similarly be used to apparate the wavefield signals. This can be understood for example by noting that a variation in the source location produces (angle-dependent) time shifts and therefore can be used to encode the data using the apparition methods described above.

For a sub-horizontally layered Earth, the recorded reflections from the interfaces between the strata lie (approximately) on hyperbolic trajectories in the space-time domain. The change in two-way traveltime of such reflections as a function of the source-receiver distance (or offset) is known as the normal moveout (NMO) and depends on the zero-offset two-way traveltime and the corresponding average sound speed in the overlying strata.

Correction of the normal moveout (NMO correction) is a standard procedure in seismic data processing which aims to remove the offset dependent part of the traveltime and align the reflected arrivals according to their zero-offset traveltime such that they can be summed yielding an initial "stack image" of the subsurface with increased signal-to-noise ratio.

NMO correction is a very efficient way to reduce the maximum time-dip in the recorded data. On the other hand NMO correction tends to stretch the data at large offsets and at early times, effectively changing (lowering) the frequency content in a space- and time-dependent manner. Let us consider the effect of NMO correction on simultaneous source data that have been acquired using e.g. seismic apparition, or similar, principles.

Because of the stretch, it follows that the NMO correction also modifies the apparition encoding filters a(t) in an offset- and time-dependent manner. However, note that such effects can be accurately predicted or modelled either from theory and first principles and/or numerical experiments. For example, if the encoding filters used were pure time delays, then the time delay after NMO correction can be predicted accurately by multiplying with an expression for NMO stretch due to Barnes (1992):

$$\beta = \frac{t_x}{t_0 - \frac{x^2 v'(t_0)}{v^3(t_0)}} \qquad (0.3)$$

where $$t_x = \sqrt{t_0^2 - \frac{x^2}{v_{rms}^2(t_0)}}$$

Alternatively, the space-time dependent effect of the NMO correction on encoding filters can be considered by evaluating the effect of NMO correction at $t_0$ on a discrete delta function $\delta(t-t_x)$ and on $a(t)*\delta(t-t_x)$, respectively, and computing, e.g., the ratio of the resulting responses in the frequency domain. This yields a time- and offset-dependent frequency filter which can be used to predict the effective modulation function (also time- and offset dependent in general) after NMO correction.

Thus, an effective modulation function takes into account, e.g., the space-time dependent effects of the NMO correction, or any other coordinate transform, on the encoding filters.

The well-known convolution theorem states that convolution in the time or space domain corresponds to multiplication in the temporal frequency or spatial frequency domain, respectively. The lesser-known dual of the convolution theorem states that multiplication in the space domain of d (n) with a so-called modulation operator m(n), corresponds to cyclic convolution of the (discrete) Fourier transform of the data, D (k), with the (discrete) Fourier transform of the modulation operator M (k)=$\mathcal{F}$ (m(n)), followed by inverse (discrete) Fourier transform. Further, we note that cyclic convolution can be implemented conveniently as a matrix multiplication or using computationally fast methods such as the fast Fourier transform (FFT).

Thus, for general aperiodic modulation functions, the recorded simultaneous source data can be modelled in the frequency-wavenumber domain as the sum of the fk-domain wavefields due to the individual sources, multiplied by one or more corresponding cyclic convolution matrices. Then, the fk-domain wavefields due to the individual sources can be obtained by inverting the data through the model. Note that in this context, here and elsewhere, setting up and solving a system of equations can equally be understood as modelling and inversion, respectively.

Note that the effect of a general aperiodic modulation as compared to a periodic modulation can thus be understood as introducing additional, scaled replications (beyond the replications at (multiples of)+/−Nyquist horizontal wavenumber) of the individual signal cones of the sources, which describe the known to be compact support of the sources, along the wavenumber axis/axes. Both the position and the scaling factor of the replications then are exactly given by the (discrete) Fourier transform of the aperiodic modulation function.

Finally, the S-transform (Stockwell, 1996) decomposes a time-signal into a time-frequency representation, localizing signals in both time and frequency. It provides a frequency-dependent resolution in accordance with the uncertainty principle while maintaining a direct relationship with the Fourier spectrum.

It is possible, then, to use the cyclic convolution principle in conjunction with the S-transform (or similar time-frequency decomposition) and NMO correction to improve the separation of aliased simultaneous source data, acquired, e.g., using seismic apparition principles, in the following manner:

1. NMO correct the (partially) aliased simultaneous source recordings using an invertible NMO transform, effectively reducing the maximum time-dip in the data.
2. Compute the S-transform of each NMO corrected simultaneous source trace. The resulting time-frequency representation implies a frequency spectrum for every time sample of every trace.
3. Iterate over all time samples of the S-transformed NMO-corrected sim source traces. For every time sample:
   a. Compute the offset (and current time) dependent effect of NMO stretch on the encoding filters using, e.g., Eq. 0.3 from Barnes (1992), providing the frequency spectrum of the effective encoding filters.
   b. Loop over all the (positive/negative) frequencies. For every frequency do:
      i. Compute the wavenumber transform of the S-transformed NMO-corrected simultaneous source data at the current time sample and frequency.
      ii. Compute the wavenumber transform of the effective modulation function.

iii. Using the cyclic convolution principle and the computed wavenumber transform of the effective modulation function, compute a forward modelling operator that relates the source one and source two contributions at the current time sample and frequency to the corresponding sim source data.

iv. Invert the sim source data at the current time sample and current frequency using the forward modelling operator.

v. Compute the inverse wavenumber transform of the inverted source one and source two contributions and store the results.

c. Optional (if all the frequencies are computed): Compute the negative frequencies from the positive frequencies using complex conjugate mirroring.

d. Store the separated frequency spectra for the current time-step building the S-transforms of the separated data one time sample by one.

4. Inverse S-transform the obtained S-transform data for source one and source two, obtaining the NMO corrected separated source one and source two data.

5. Inverse NMO correct separated s1 and s2 data.

The list of steps is merely included for completeness of the description of a method which improves the separation of aliased simultaneous source data.

The NMO is a coordinate transformation that reduces the spatial bandwidth of the recorded data, and therefore limiting the effect of aliasing. We now proceed to discuss methods that use other coordinate transformations, and also how several coordinate transformations can be used simultaneously. Moreover, we also discuss how to make reconstruction in two steps: First by making partial reconstructions, using only the non-aliased parts; and secondly to use these partial reconstructions to regularize and solve the full reconstruction problem by means of directionality estimates, that imply local coordinate transformations specifying directions with reduced bandwidth, and hence, reduced aliasing effects.

Further, to provide a more complete summary of methods for dealing with aliased simultaneous source data, we review the notation and recapitulate the theory for regular seismic apparition. We use the notation $$\hat{f}(\xi) = \int_{-\infty}^{\infty} f(x) e^{-2\pi i x \xi} dx,$$

for the Fourier transform in one variable, and consequently $\hat{f}(\omega, \xi)$ for the Fourier transform of two dimensional function $f(t, x)$ with a time (t) and spatial (x) dependence.

Suppose that $f_1 = f_1(t, x)$ and $f_2 = f_2(t, x)$ are two function with frequency support in two cones of the form $$\frac{\omega^2}{c^2} \geq \xi^2. \quad (1)$$

The constraint comes from assuming that the functions $f_1$ and $f_2$ represent the recording of a wavefield at time t at a fixed receiver coordinate, source coordinate x, and fixed depth, where the recorded wave field at this depth is a solution to the homogeneous wave equation with a velocity c. The wavefields are generated at discrete values of x which we assume to be equally spaced, i.e. of the form $x = \Delta_x k$.

We now assume that the two sources are used simultaneously, in such a way that their mixture takes the form $$d(t, k) = f_1(t, k\ \Delta_x) + f_2(t - \Delta_t (-1)^k, k\ \Delta_x) =$$

$$\mathcal{F}^*(\hat{f}_1)(t, k\ \Delta_x) + \mathcal{F}^*(\hat{f}_2(\omega, \xi) e^{-2\pi i (-1)^k \Delta_t \omega})(t, k\ \Delta_x),$$

i.e., the recorded data is now modelled as a sum of the two functions, but where one of them has been subjected to a periodic time shift. In a more general version more general filtering operations than time shifts can be applied. Let $a_k$ be filter operators (acting on the time variable) where the k dependence is such it only depends on if k is odd or even, i.e., that $a_k = a_{k(mod2)}$.

$$d(t, k) = f_1(t, k\ \Delta_x) + a_k f_2(t - \Delta_t (-1)^k, k\ \Delta_x) = \mathcal{F}^*(\hat{f}_1)(t, k\ \Delta_x) + \quad (2)$$

$$\int a_k(\omega) \int \hat{f}_2(\omega, \xi) e^{2\pi i k \Delta_x \xi} d\xi e^{2\pi i (t - (-1)^k \Delta_t) \omega} d\omega =$$

$$\mathcal{F}^*(\hat{f}_1)(t, k\ \Delta_x) + (\mathcal{T}\mathcal{F}^*(\hat{f}_2))(t, k\ \Delta_x),$$

It can be shown that $$D_1(\omega, \xi) = \int_{-\infty}^{\infty} \sum_{k=-\infty}^{\infty} d(t, k) e^{-2\pi i (k \Delta_x \xi + t \omega)} dt = \left( \sum_{k=-\infty}^{\infty} \hat{f}_1\left(\omega, \xi + \frac{k}{\Delta_x}\right) \right) + \quad (3)$$

$$\left( \sum_{k=-\infty}^{\infty} \hat{f}_2\left(\omega, \xi + \frac{k}{2\Delta_x}\right) \right) \frac{1}{2} (\hat{a}_0 \Delta(\omega) e^{-2\pi i \Delta_t \omega} + (-1)^k \hat{a}_1(\omega) e^{2\pi i \Delta_t \omega}).$$

Now, due to the assumption of conic support of $\hat{f}_1$ and $\hat{f}_2$ it holds that if $$|\xi| < \frac{|\omega|}{c}, |\omega| < c \left| \xi - \frac{1}{\Delta_x} \right|, |\omega| < c \left| \xi + \frac{1}{\Delta_x} \right|, \quad (4)$$

then only the terms where k=0 above contribute, and the following simplified relation holds $$D_1(\omega, \xi) = \hat{f}_1(\omega, \xi) + \hat{f}_2(\omega, \xi) \frac{\hat{a}_0(\omega) e^{-2\pi i \Delta_t \omega} + \hat{a}_1(\omega) e^{2\pi i \Delta_t \omega}}{2}.$$

In a similar fashion it holds for $$D_2(\omega, \xi) = \int_{-\infty}^{\infty} \sum^k d(t + \Delta_t (-1)^k, k) e^{-2\pi i (k\xi + t\omega)} dt, \quad (5)$$

$$= \hat{f}_1 \cos(2\pi \Delta_t \omega)(\omega, \xi) + \hat{f}_2(\omega, \xi) \frac{\hat{a}_0(\omega) + \hat{a}_1(\omega)}{2}.$$

This implies that for each pair $(\omega, \xi)$ satisfying (4), the values of $\hat{f}_1(\omega, \xi)$ and $\hat{f}_2(\omega, \xi)$ can be obtained by solving the linear system of equations $$\begin{pmatrix} 1 & \frac{\hat{a}_0(\omega) e^{-2\pi i \Delta_t \omega} + \hat{a}_1(\omega) e^{2\pi i \Delta_t \omega}}{2} \\ \cos(2\pi \Delta_t \omega) & \frac{\hat{a}_0(\omega) + \hat{a}_1(\omega)}{2} \end{pmatrix} \begin{pmatrix} \hat{f}_1(\omega, \xi) \\ \hat{f}_2(\omega, \xi) \end{pmatrix} \begin{pmatrix} D_1(\omega, \xi) \\ D_2(\omega, \xi) \end{pmatrix}. \quad (6)$$

This provides information on how to recover the wavefields $f_1$ and $f_2$ for frequencies either up to the limit $c/(4 \Delta_x)$, or more generally, satisfying the (diamond shaped) condition (4). The overlaps of the cones are illustrated in FIG. 2, where the left panel shows horizontally striped the cone given by (1), and the right panel the diamond shaped region described by (4). In this approach the deblending takes place by considering the data available in the central cone of FIG. 2.

An alternative approach for reconstruction, is by noting that if either of the support constraints (1) or (4) are satisfied, then it holds that for the values of $(\omega, \xi)$ of interest that (3) reduces for instance to $$D_1\left(\omega, \xi - \frac{1}{2\Delta_x}\right) = \hat{f}_2(\omega, \xi) \frac{1}{2}(\hat{a}_0(\omega)e^{-2\pi i \Delta_t \omega} + (-1)^k \hat{a}_1(\omega)e^{2\pi i \Delta_t \omega}),$$

implying that $\hat{f}_2(\omega, \xi)$ can be recovered from $$D_1\left(\omega, \xi - \frac{1}{2\Delta_x}\right).$$

In a similar fashion, $\hat{f}_1(\omega, \xi)$ can be recovered from $$D_2\left(\omega, \xi - \frac{1}{2\Delta_x}\right).$$

In this way, the deblending can be achieved by direct consideration of the data in the shifted cones illustrated in FIG. 2.

From (6) it is possible to recover the functions $f_1$ and $f_2$ partially. Let w be a filter such that $\hat{w}$ has support inside the region described by (4). It is then possible to recover $$h_1 = w * f_1, h_2 = w * f_2 \qquad (7)$$

For values of $(\omega, \xi)$ outside the region described by (4), it is not possible to determine $\hat{f}_1(\omega, \xi)$ and $\hat{f}_2(\omega, \xi)$ uniquely without imposing additional constraints. Typically, seismic data can locally be well described by sums of plane waves with different directions. The plane waves carry the imprint of the source wavelet, and according to ray theory the data from such a plane event should have the same directionality for the frequency range that covers the source wavelet. We can use this information to construct a directionality penalty that we can use for the separation of the two wavefields $f_1$ and $f_2$ from the blended data d. This directionality penalty is equivalent to, by means of local coordinate transformations, imposing a bandwidth limitation in undesired directions for the purpose of suppressing aliasing.

One way of estimating local directionality is by means of so-called structure tensors. For the two known wavefields $h_1$ and $h_2$ the corresponding structure tensors are defined as $$T_1(t, x) = \begin{pmatrix} \left(K * \left(\frac{\partial h_1}{\partial t}\right)^2\right)(t, x) & \left(K * \frac{\partial h_1}{\partial t} \frac{\partial h_1}{\partial x}\right)(t, x) \\ \left(K * \frac{\partial h_1}{\partial t} \frac{\partial h_1}{\partial x}\right)(t, x) & \left(K * \left(\frac{\partial h_1}{\partial x}\right)^2\right)(t, x) \end{pmatrix},$$

and similarly for $T_2$ and $h_2$. Above, the function K describes a smooth, localizing windows, for instance a Gaussian. The eigenvalues of $T_1$ and $T_2$ will point-wise describe the local energy in the direction of maximum and minimum variation, and the associated eigenvectors contain the corresponding directions. The tensors are computed as elementwise convolutions of the outer product of the gradient of the underlying function, and this directly defines the generalization to higher dimensions. For the sake of simplicity, we describe here the two-dimensional case.

Let $s_1^1(t, x)$ and $s_2^1(t, x)$ be the eigenvalues of $T_1(t, x)$, and let $e_1^1(t, x)$ and $e_2^1(t, x)$ denote the corresponding eigenvectors. If the wavefield $f_1$ only has energy in one direction in the vicinity around $(t, x)$ covered by K, then this implies that $$s_2^1(t,x)=0,$$

which in turn means that $$\nabla f_1 \cdot e_2^1 = 0. \qquad (8)$$

The eigenvectors $e_1^1(t, x)$ and $e_2^1(t, x)$ define local coordinate transformation that describe directions of large and small variations. Along the directions specified by $e_2^1(t, x)$ only low-frequency components are to be dominant, and by suppressing the bandwidth of the reconstructions in these directions is an efficient way of de-aliasing the separated sources.

This property (8) is clearly not always satisfied (although counterparts in higher dimension hold more frequently with increased dimensionality), however it is a property that can be used as a penalty from which the blended data can be deblended. Even if (8) is not satisfied, the relation can be used to minimize the energy of the deblended data in the directions carried from $h_1$ and $h_2$, respectively.

From (8) we have a condition on the gradient of $f_1$ and $f_2$ when one the eigenvectors vanishes. For the more general case, we would need to formulate a penalty function that can deal with the cases where the components change gradually, and at places where the eigenvectors are equal in size, and equal amount of penalty should be used for the two directions. One such choice is to define $$S(T_m) = \sum_{j=1}^{2} s_j(\sigma)e_j^m(e_j^m)^T, \quad T_m = \sum_{j=1}^{2} \sigma_j e_j^m(e_j^m)^T$$

with $$s_1(\sigma) = \frac{1}{2} \cdot \frac{\sigma_2^2}{\sigma_1^2} \exp\left(-\frac{1}{2} \cdot \frac{\sigma_2}{\sigma_1}\right)$$

$$s_2(\sigma) = \left(1 - \frac{1}{2} \cdot \frac{\sigma_2}{\sigma_1}\right) \exp\left(-\frac{1}{2} \cdot \frac{\sigma_2}{\sigma_1}\right).$$

These functions have the property that $$\lim_{\sigma_2 \to 0} (s_1, s_2) \to (0, 1)$$

and $$s_1(\sigma_1, \sigma_1) = s_2(\sigma_1, \sigma_1).$$

implying that (8) will be satisfied in the case where there is locally only energy in one direction, and where an equal amount of penalty will be applied in the case where there is the same amount of energy in both directions. Note that the local coordinate transformations are now implicitly given in the operator S.

This definition now allows for the generalization of (8) to penalty functionals $$\iint ((\nabla f_1)^T S(T_1) \nabla f_1)(t,x) dt dx,$$

and $$\iint ((\nabla f_2)^T S(T_2) \nabla f_2)(t,x) dt dx,$$

for the two wavefields. The expressions above describe the energy in the undesirable direction, given the knowledge of the bandpass filtered versions $h_1$ and $h_2$, respectively. The de-aliasing is now taken place by punishing high frequencies (by the derivatives) along the directions given by the local coordinate transformations specified by $e_1^{\ 1}(t, x)$ and $e_2^{\ 1}(t, x)$.

Before we use these expressions to define a minimization problem that describes the deblending procedure, we incorporate the original cone condition (1) in the formulation. To this end, we will now work with sampled representations of $\hat{f}_1$ and $\hat{f}_2$. In the following, redefining the notation, we will also use $\hat{f}_1$ and $\hat{f}_2$ to denote these sampled values.

We let $\mathcal{F}^*_c$ denote the inverse Fourier operator that is restricted to functions supported on the cone defined by (1). Recall the definition of the apparition operator T from (2). The relationship (2) is then satisfied for (the non-unique) solutions to $$\min_{\hat{f}_1, \hat{f}_2} \|\mathcal{F}^*_c \hat{f}_1 + T\mathcal{F}^*_c \hat{f}_2 - d\|^2,$$

with the additional constraint that $\hat{f}_1$ and $\hat{f}_2$ have support on the cone defined by (1). To obtain a unique approximate solution, we now add the directionality penalties and consider $$\min_{\hat{f}_1, \hat{f}_1} \|\mathcal{F}^*_c \hat{f}_1 + T\mathcal{F}^*_c \hat{f}_2 - d\|^2 + \tag{9}$$

$$\iint \left( (\nabla (\mathcal{F}^*_c \hat{f}_1))^T S(T_1) \nabla (\mathcal{F}^*_c \hat{f}_1) \right)(t,x) dt dx +$$

$$\iint \left( (\nabla (\mathcal{F}^*_c \hat{f}_2))^T S(T_2) \nabla (\mathcal{F}^*_c \hat{f}_2) \right)(t,x) dt dx.$$

with the same cone constraint. To find the minima of (9), we compute the Fréchet derivatives of the objective function (9) with respect to the functions $\hat{f}_1$ and $\hat{f}_2$ and equate them to zero as they should at a minimum. The first term in (9) is straightforward to derive, and concerning the other two terms it is readily verified using partial integrations that their Fréchet derivatives are described by the elliptic operators $$D_m(f) = \nabla (S(T_m) \nabla f)$$

To formulate the solution to (9), let $$b_1 = \mathcal{F}_c d, b_2 = \mathcal{F}_c Td,$$

Furthermore, introduce $$A_F = \begin{pmatrix} \mathcal{F}_c \mathcal{F}^*_c & \mathcal{F}_c T \mathcal{F}^*_c \\ \mathcal{F}_c T^* \mathcal{F}^*_c & \mathcal{F}_c \mathcal{F}^*_c \end{pmatrix}, \text{ and}$$

$$A_D = \alpha \begin{pmatrix} \mathcal{F}_c D_1 \mathcal{F}^*_c \\ \mathcal{F}_c D_2 \mathcal{F}^*_c \end{pmatrix}.$$

Equating the Fréchet derivatives of (9) with respect to $\hat{f}_1$ and $\hat{f}_2$ to zero then yield the linear relationship $$(A_F \ A_D) \begin{pmatrix} \hat{f}_1 \\ \hat{f}_2 \end{pmatrix} = \begin{pmatrix} b_1 \\ b_2 \end{pmatrix} \tag{10}$$

for the solution of (9). This equation can be solved using an iterative solver for linear equations, for instance the conjugate gradient method. The operators in $A_F$ are realized using standard FFT, and the operators in $A_D$ are computed using a combination of Fourier transforms and differential schemes, that also may be implemented by using FFT. The operator $A_F$ describe the fit to data, while the operator $A_D$ describe the de-aliasing that takes places using the local coordinate transformations induced from $e_1^{\ 1}(t, x)$ and $e_2^{\ 1}(t, x)$.

De-Aliasing Using Coordinate Transformations

Mutual Parabolic Change of Coordinates

As seen, for the direct deblending using seismic apparition to work it is required that the energy is contained in either a combination of the cone constraint (1) along with the condition $|\omega| < c/(4 \Delta_x)$, or in the larger domain determined by (4). Given the characteristics of seismic data, improvements to these constraints can sometime be obtained by changes of coordinates. The simplest case where this can be utilized is by using a parabolic change of coordinates. This would apply in cases where the two source locations are close to each other. Let $E^k$ describe the coordinate map $$t = E^k(\tau) = \tau + qx^2,$$

for some choice of parameter q. Now, let $$d^{par}(\tau,k) = d(E^k(\tau),k) = \mathcal{F}^*(\hat{f}_1)(\tau + qx^2, k\Delta_x) + (\mathcal{T}\mathcal{F}^*(\hat{f}_2))(\tau - qx^2, k\Delta_x),$$

and let $$f_1^{par}(\tau,x) = f_1(\tau + qx^2, x) \text{ and } f_2^{par}(\tau,x) = f_2(\tau + qx^2, x).$$

Clearly, it holds that $$(\mathcal{T}\mathcal{F}^*(\hat{f}_2))(\tau + qx^2, k\Delta_x) = a_k f_2(t + qx^2 - \Delta_t(-1)^k, k\Delta_x)$$
$$= a_k f_2^{par}(t - \Delta_t(-1)^k, k\Delta_x) = (\mathcal{T}\mathcal{F}^*(f_2^{par}))(\tau, k\Delta_x).$$

It then holds that $$d^{par}(\tau,k) = \mathcal{F}^*(f_1^{par})(\tau, k\Delta_x) - (\mathcal{T}\mathcal{F}^*(f_2^{par}))(\tau, \Delta_x),$$

and the regular apparition technique can now be directly applied to $d^{par}(\tau, k)$ to deblend $f_1^{par}$ and $f_2^{par}$ and hence also $f_1$ and $f_2$.

Separate Coordinate Systems and NMO

Next, still summarizing methods that can improve the separation of aliased simultaneous source data, we consider the situation where aliasing effects can be reduced for $f_1$ and $f_2$ when exposed to two different sets of coordinate transformation. Let $$E_1^k : \mathbb{R} \to \mathbb{R}, \text{ and } E_2^k : \mathbb{R} \to \mathbb{R},$$

be continuous bijective coordinate transformations, and let $$f_1^n(\tau, k\Delta_x) = f_1(E_1^k(\tau), k\Delta_x), \text{ and } f_2^n(\tau, k\Delta_x) = f_2(E_2^k \tau), k\Delta_x).$$

The purpose of the coordinate transformations is to make the effective support of $\hat{f}_1^n$ and $\hat{f}_2^n$ be smaller than $\hat{f}_1$ and $\hat{f}_2$, or at least that the energy content that is contained in regions of the form (4) relative to the total energy is higher for the functions $\hat{f}_1^n$ and $\hat{f}_2^n$ in comparison to that of $\hat{f}_1$ and $\hat{f}_2$. In this way the aliasing effects when making reconstructions with limited frequency support hopefully be reduced.

However, the reduction of the aliasing effect for, say the first source, may have a negative influence on the aliasing of the second source when applying the coordinate transformations to blended data. In many cases, the data cannot be separated directly, but the effects on both the sources need to be taken into account. The interplay between the two sources and the coordinate transformations can be modelled by means of linear systems, and by solving these systems we can obtain de-aliased deblending.

Recall that in the regular apparition setup, the functions $f_1$ and $f_2$ could be recovered using either the central frequency cone or one of the aliased versions. In the case where the central cone was used, a (2×2) system of equations has to be solved for the recovery of the point-wise values of $\hat{f}_1(\omega, \xi)$ and $\hat{f}_2(\omega, \xi)$, while when considering the shifted cones, the values of $\hat{f}_1(\omega, \xi)$ and $\hat{f}_2(\omega, \xi)$ were obtained directly by a correction factor. In the presence of the coordinate transformations, neither one of the solutions will be directly applicable. However, it will still be the case that most of the energy (excluding induced aliasing effects from the opposite coordinate map) in the shifted cones will be due to only one of the two sources. We will make use of this fact, in combination with the fact that the sum of the two representations should equal the measured data, and in this way set up a linear system of equations for the solution of the de-aliased-deblending problem.

To simplify the presentation, let us assume in this section that the filter operators $a_k$ are identity operators. Let us introduce $$d_1^n(\tau,k) = f_1(E_1^k(\tau) + \Delta_t(-1)^k, k\Delta_x) + f_2(E_1^k(\tau), k\Delta_x)$$

and $$d_2^n(\tau,k) = f_1(\tau, k\Delta_x) + f_2(E_2^k(\tau) - \Delta_t(-1)^k, k\Delta_x)$$

By assuming sufficiently dense sampling in time, $d_1^n$ and $d_2^n$ can be computed by resampling of the measured data d. We now seek representations of $d_1^n$ and $d_2^n$ using the (non-aliased) Fourier representations $\hat{f}_1^n$ and $\hat{f}_2^n$. These representations read $$d_1^n(\tau,k) = (\mathcal{F} *\hat{f}_1^n)((E_1^k)^{-1}(E_1^k(\tau) + \Delta_t(-1)^k), k\Delta_x) + (\mathcal{F} *\hat{f}_2^n)((E_2^k)^{-1}(E_1^k(\tau)), k\Delta_x)$$

and $$d_2^n(\tau,k) = (\mathcal{F} *\hat{f}_1^n)((E_1^k)^{-1}(E_2^k(\tau)), k\Delta_x) + (\mathcal{F} *\hat{f}_2^n)((E_2^k)^{-1}(E_2^k(\tau) - \Delta_t(-1)^k), k\Delta_x)$$

respectively. Suppose now that T is sampled discretely at equally spaced points, specifically $$\tau^0(j) = j\Delta_\tau, \quad -\frac{N_\tau}{2} \leq j < \frac{N_\tau}{2},$$

with a sampling in the corresponding frequency variable $$\Omega(j') = j'\Delta_\Omega, \quad -\frac{N_\tau}{2} \leq j' < \frac{N_\tau}{2},$$

where $(\Delta_T \Delta_\Omega)^{-1} = N_\tau$. Also, let $\Xi(k')$ be an equally spaced sampling of the spatial frequency parameter $\xi$.

Let us introduce the coordinates $$\tau_{m,k}^{11} = (E_1^k)^{-1}(E_1^k(\tau) + \Delta_t(-1)^k, k\Delta_x),$$

$$\tau_{m,k}^{12} = (E_2^k)^{-1}(E_1^k(\tau), k\Delta_x),$$

$$\tau_{m,k}^{21} = (E_1^k)^{-1}(E_2^k(\tau), k\Delta_x),$$

$$\tau_{m,k}^{22} = (E_2^k)^{-1}(E_2^k(\tau) - \Delta_t(-1)^k, k\Delta_x),$$

We seek discrete Fourier representations of $d_1^n(\tau, k)$ and $d_2^n(\tau, k)$, respectively. For these representations, we want to include only the frequencies that satisfy the condition (4) or something similar. To this end, we introduce the mapping $\tau$: $\mathbb{Z} \to \mathbb{Z}^2$ that is indexing the points $(\Omega(j'), \Xi(k'))$, i.e., such that all the points $(\Omega(\iota(l)), \Xi(\iota(l)))$ satisfy a condition similar to (4).

The Fourier representations can then be expressed using the element-wise defined Fourier matrices $$\mathcal{F} *^{11}(l;(j,k)) = e^{2\pi i(\Xi(\iota(l))k\Delta_x + \Omega(\iota(l))\tau_{l,k}^{11})},$$

$$\mathcal{F} *^{12}(l;(j,k)) = e^{2\pi i(\Xi(\iota(l))k\Delta_x + \Omega(\iota(l))\tau_{l,k}^{12})},$$

$$\mathcal{F} *^{21}(l;(j,k)) = e^{2\pi i(\Xi(\iota(l))k\Delta_x + \Omega(\iota(l))\tau_{l,k}^{21})},$$

$$\mathcal{F} *^{22}(l;(j,k)) = e^{2\pi i(\Xi(\iota(l))k\Delta_x + \Omega(\iota(l))\tau_{l,k}^{22})},$$

Again, redefining the notation, we now use $\hat{f}_1^n$ and $\hat{f}_2^n$ also for the discrete representations, and similarly for $d_1^n$ and $d_2^n$. We then have that $$d_1^n = \mathcal{F} *^{11}\hat{f}_1^n - \mathcal{F} *^{12}\hat{f}_2^n,$$

and $$d_2^n = \mathcal{F} *^{21}\hat{f}_1^n - \mathcal{F} *^{22}\hat{f}_2^n,$$

The next step is now to provide a formulation where the contribution from the two sources can be separated. As a first step, we will make use of the fact that the energy present in the shifted Fourier cones of $d_1^n$ and $d_2^n$ corresponds primarily of energy from $f_1^n$ and $f_2^n$, respectively. Defining $\mathcal{F}^0$ element-wise by $$\mathcal{F}^0(l;(j,k)) = e^{-2\pi i(\Xi(\iota(l))k\Delta_x + \Omega(\iota(l))\tau^0(j))}.$$

Recall that a frequency shift in representations using the discrete Fourier transform can be represented by a multiplication by $(-1)^k$. Hence, define $$Sf(\tau,k) = (-1)^k f(\tau,k).$$

as the operator that is shifting information to the cones of interest. This implies that the $\hat{f}_2^n$ is almost in the null-space of the mapping $$(\hat{f}_1^n, \hat{f}_2^n) \mapsto \mathcal{F}^0 S(\mathcal{F} *^{11}\hat{f}_1^n + \mathcal{F} *^{12}\hat{f}_2^n)$$

and similarly, $\hat{f}_1^n$ is almost in the null-space of the mapping $$(\hat{f}_1^n, \hat{f}_2^n) \mapsto \mathcal{F}^0 S(\mathcal{F} *^{21}\hat{f}_1^n + \mathcal{F} *^{22}\hat{f}_2^n)$$

or in other words, the mapping $$(\hat{f}_1^n, \hat{f}_2^n) \mapsto (\mathcal{F}^0 S(\mathcal{F} *^{11}\hat{f}_1^n + \mathcal{F} *^{12}\hat{f}_2^n), \mathcal{F}^0 S(\mathcal{F} *^{21}\hat{f}_1^n - \mathcal{F} *^{22}\hat{f}_2^n))$$

is almost block-diagonal. The matrix describing the map above will be square, and hence an iterative method such as the generalized minimal residual method (GMRES) could be applied to this problem, given the right hand side $$\begin{pmatrix} \mathcal{F}^0 S d_1^n \\ \mathcal{F}^0 S d_2^n \end{pmatrix}.$$

However, using this information by itself means some loss of control in the residual to the data fit. To counteract that effect, we may also include an error term for the fit to the measured data. An overdetermined system for this case then reads $$\begin{pmatrix} \mathcal{F}^0 S \mathcal{F}^{*11} & \mathcal{F}^0 S \mathcal{F}^{*12} \\ \mathcal{F}^0 S \mathcal{F}^{*21} & \mathcal{F}^0 S \mathcal{F}^{*22} \\ \alpha \mathcal{F}^{*11} & \alpha \mathcal{F}^{*12} \\ \alpha \mathcal{F}^{*21} & \alpha \mathcal{F}^{*22} \end{pmatrix} \begin{pmatrix} \hat{f}_1^n \\ \hat{f}_2^n \end{pmatrix} = \begin{pmatrix} \mathcal{F}^0 S d_1^n \\ \mathcal{F}^0 S d_2^n \\ \alpha d_1^n \\ \alpha d_2^n \end{pmatrix}. \tag{11}$$

Let us end by discussing how to choose the coordinate transformation when dealing with NMO for different parameterizations. Let us define the Heaviside function by $$\Theta(t) = \begin{cases} 1 & \text{if } t \geq 0 \\ 0 & \text{otherwise} \end{cases}$$

and define $\text{sign}(t)=2\Theta(t)-1$. Let us define the NMO mapping $E_{\tau_0,t_0,q}$ by $$t = E_{\tau_0,t_0,q}^x(\tau) = t_0 + \text{sign}(\tau-\tau_0) \sqrt{(\tau-\tau_0)^2 + q(x-x_0)^2 + 2\Theta(\tau-\tau_0)\sqrt{q}|x-x_0|}. \tag{12}$$

This mapping is bijective with inverse $$\tau = \left(E_{\tau_0,t_0,q}^x\right)^{-1}(t) = \tau_0 + \text{sign}(t - t_0 + \sqrt{q}|x - x_0|) \times$$

$$\sqrt{\left(t - t_0 + 2(\Theta(t - t_0 - \sqrt{q}|x - x_0|) - 1)\sqrt{q}|x - x_0|\right)^2 - q(x - x_0)^2}.$$

This coordinate transformation is chosen such that $$\frac{d}{dt}\left(E_{\tau_0,t_0,q}^x\right)^{-1}(t)$$

is continuous.

Note that the presented methods of using coordinate transformations could favourably be applied simultaneously, where expected known aliasing effects can be reduced using for instance the NMO mappings mentioned above, along with a data driven de-aliasing part that uses the local coordinate transformations for the directionality penalties.

In yet another example of a method to improve the dealiasing of simultaneous source data, if we apply an NMO correction to acquired simultaneous source data acquired using seismic apparition principles, one of the sources, say source A, will only produce a signal cone at k=0 (i.e., at zero horizontal wavenumber) but that now is more compactly supported as a result of the NMO correction. However, the other source, say source B, will produce two more compactly supported signal cones centered at k=0 and k=$k_n$. We can therefore isolate the signal cone at k=$k_n$ (i.e., at Nyquist horizontal wavenumber) and apply inverse NMO correction to achieve approximate separation of the wavefield due to source A. Such approximate separation methods could yield acceptable results, particularly when combined with other methods such as least-squares adaptive subtraction (Dragoset, 1995).

Alternatively, one could use an apparition function that does not involve a time shift (e.g., A=0.5). In this case, the apparition encoding function will be "immune" to the stretch effect of NMO correction such that the described non time-variant separation methods can be used. Yet another option to continue using the described non time-variant separation methods would be to use stretch-free NMO operators which have been proposed previously (e.g., Trickett, 2003; Zhang et al., 2012).

Another method to handle aliased data when using, e.g., time-shifts as apparition encoding functions is to use NMO and create a look-up table of many solutions for different time shifts. We then piece together solutions sample by sample by choosing the appropriate sample in time and space for the time shift for a specific sample taking into account both the original time shift and the distortion introduced by NMO correction.

We note that (source) ghost reflections may also be considered simultaneous sources and, e.g., the methods summarized above for improved separation in the presence of aliasing also apply to the problem of (source) deghosting by simultaneous source deblending in the presence of aliasing.

To understand source deghosting by simultaneous source deblending, consider the following example: a line of ghost sources with alternating depths such as shown in FIG. 3 (open white stars) can be thought of as being constructed from ghost sources at a uniform distance from the original sea surface location ($-z_1$, i.e., the level closest to the original sea surface location) through the convolution of a modulation function:

$$\tilde{p}^g(n_x,n_y) = m_1(n_x,n_y) * p^g(n_x,n_y), \tag{13}$$

where the lower case variables denote expressions in the time space domain, $n_x$ is the shot number (spaced uniformly along a line) in the x-direction and $n_y$ is the number of the parallel shot-line and $m_1(n_x, n_y)$ is the modulating function:

$$m_1(n_x, n_y) = \frac{1}{2}[1 + (-1)^{n_x}] + \frac{1}{2}a[1 - (-1)^{n_x}] \tag{14}$$

$$= \frac{1}{2}[1 + e^{i\pi n_x}] + \frac{1}{2}a[1 - e^{i\pi n_x}].$$

The function a is a redatuming operator which is both a temporal and spatial filter [hence the convolution in space in equation (13)], which can be written in the frequency-wavenumber domain as:

$$A(\omega, k_x, k_y) = e^{ik_z \Delta z} = e^{i\sqrt{(\omega/c)^2 - k_x^2 - k_y^2} \Delta z}, \tag{15}$$

where $\Delta z = z_2 - z_1$. The action of a can then be obtained from the relation $$af(t, x, y) =$$

$$\text{Re}\left(\frac{2}{(2\pi)^{3/2}} \int_0^\infty \int \int_{\mathbb{R}^2} \hat{f}(\omega, k_x, k_y) A(\omega, k_x, k_y) e^{i(t\omega + xk_x + yk_y)} d\omega dk_x dk_y\right).$$

The above equation (15) may be considered as a general example of a possible mathematical description of a redatuming operator, here in the frequency-wavenumber domain. In the frequency-wavenumber domain we obtain the following expression for the ghost wavefield using capital letters for the variables in the frequency-wavenumber domain:

$$\tilde{P}^g(\omega, k_x, k_y) = \frac{1}{2}[1 + A(\omega, k_x, k_y)]P^g(\omega, k_x, k_y) + \tag{16}$$

-continued $$\frac{1}{2}[1 - A(\omega, k_x, k_y)]P^g(\omega, k_x - k_N, k_y),$$

which follows from a standard Fourier transform result (wavenumber shift; Bracewell, 1999).

Equation (16) shows that data from (staggered) ghost sources $\tilde{p}^g(n_x, n_y)$ will be scaled and replicated or partitioned into two places in the spectral domain. Part of the data will remain in a cone centred around k=0 with the limits of the cone defined by the slowest propagation velocity of the wavefield in the medium and part of the data will be scaled and replicated or partitioned into a signal cone centered around $k_N$ along the $k_x$-axis with $k_N$ denoting the Nyquist wavenumber representing the sampling frequency of the data. In other words, part of the data will remain at the signal cone centered around k=0 (denoted by H$^+$ in FIG. 1B) and part of the data will be scaled and replicated to a signal cone centered around $k_N$ (denoted by H$^-$).

Figure 12:
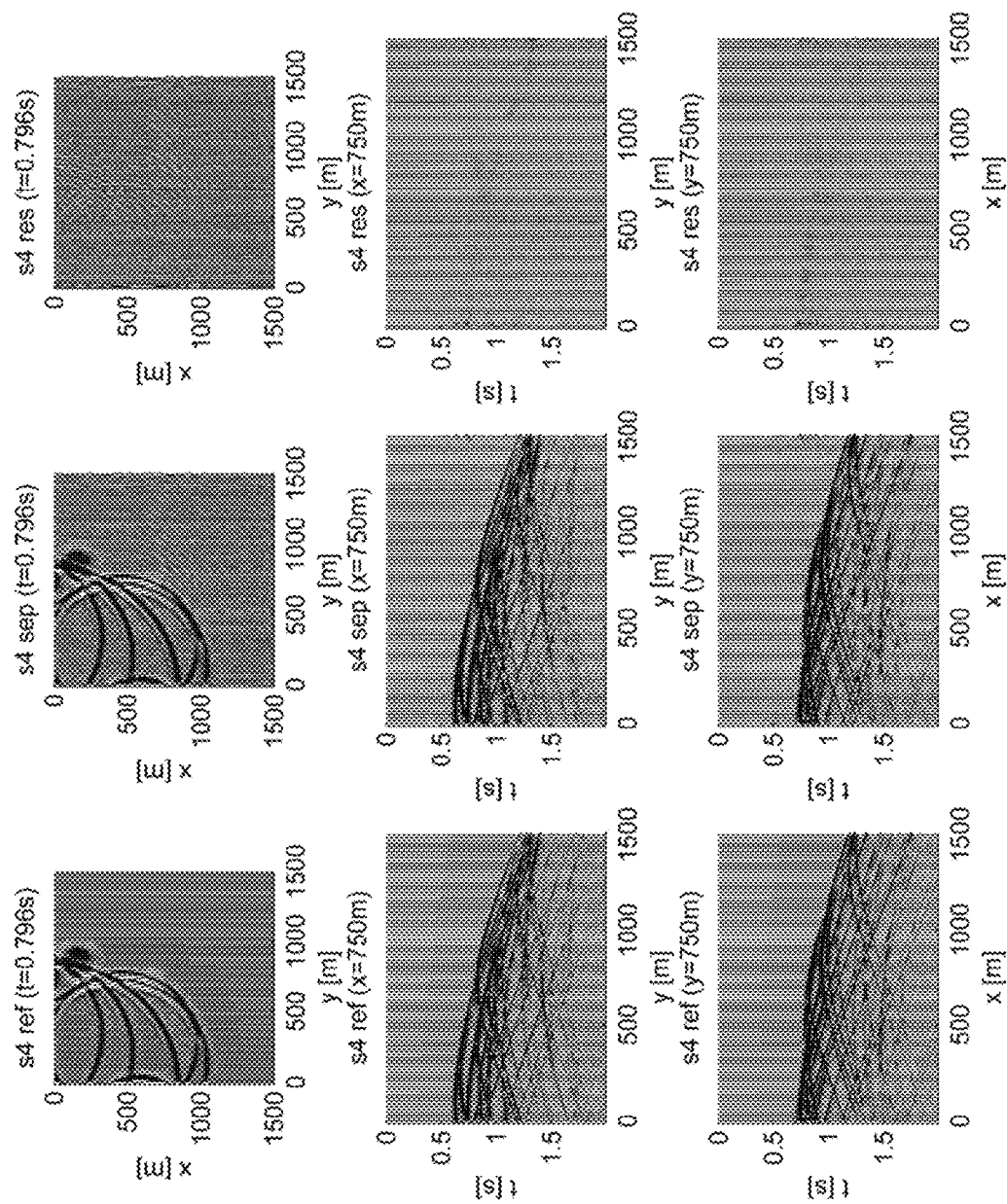
FIG. 12 shows three slices (top, middle, bottom) through the 3D volume of synthetic simultaneous source data modeled for the fourth source and its shot locations in FIG. 5, activated independently and without encoding time delays, shooting into a single receiver at the origin above a model with 64 point scatterers (left column), and in the middle column, the same slices are shown for the separated data, while in the right column, the difference between the modeled (reference) and separated data for the fourth source is shown.

The carpet of desired (non-ghost) sources (solid black stars in FIG. 12 shown along a profile in the x-direction) with alternating depths can also be constructed from desired sources at a uniform depth $z_1$ (the level closest to the original sea surface location) through the convolution of another modulation function:

$$\tilde{p}^d(n_x, n_y) = m_2(n_x, n_y) * p^d(n_x, n_y),$$ (17)

where $m_2(n_x, n_y)$ is the modulating function:

$$m_2(n_x, n_y) = \frac{1}{2}[1 + (-1)^{n_x}] + \frac{1}{2}b[1 - (-1)^{n_x}]$$ (18)
$$= \frac{1}{2}[1 + e^{i\pi n_x}] + \frac{1}{2}b[1 - e^{i\pi n_x}].$$

Again, the function b is a redatuming operator in the opposite direction compared to a such that:

$$B(\omega, k_x, k_y) = A^{-1}.$$ (19)

In the frequency-wavenumber domain we therefore obtain the following expression:

$$\tilde{P}^d(\omega, k_x, k_y) =$$ (20)
$$\frac{1}{2}[1 + A^{-1}]P^d(\omega, k_x, k_y) + \frac{1}{2}[1 - A^{-1}]P^d(\omega, k_x - k_N, k_y).$$

Again, equation (20) shows that the data from the (staggered) desired sources $\tilde{p}^d(n_x, n_y)$ will be scaled and replicated or partitioned into two places in the spectral domain. Part of the data will remain at the signal cone centred around k=0 and part of the data will be scaled and replicated or partitioned to a signal cone centered around $k_N$ along the $k_x$-axis. In other words, part of the data will remain at the signal cone centered around k=0 (denoted by H$^+$ in FIG. 1B) and part of the data will be scaled and replicated to a signal cone centered around $k_N$ (denoted by H$^-$).

One method of source deghosting uses equations (16) and (20). Equations (16) and (20) tell what the mix is of desired and ghost sources that occur around k=0 (in the following denoted by $F^0$):

$$F^0 = \frac{1}{2}[1 + A(\omega, k_x, k_y)]P^g(\omega, k_x, k_y) + \frac{1}{2}[1 + A^{-1}]P^d(\omega, k_x, k_y).$$ (21)

In addition, equations (16) and (20) also tell what the mix of desired and ghost sources is that occur around $k_N$ along the $k_x$-axis (in the following denoted by $F^N$):

$$F^N = \frac{1}{2}[1 - A(\omega, k_x, k_y)]P^g(\omega, k_x, k_y) + \frac{1}{2}[1 - A^{-1}]P^d(\omega, k_x, k_y).$$ (22)

Equations (21) and (22) can be combined to give an expression for the wavefield of interest emitted from the desired source (i.e., the source-side deghosted wavefield):

$$P^d = \frac{(1 + A)F^N - (1 - A)F^0}{(A - A^{-1})}.$$ (23)

Since the operator A is known from equation (15), the deghosted wavefield (i.e., the wavefield of interest) can be computed explicitly.

Note that A can be determined accurately for a 3D acquisition geometry. If the cross-line spacing is coarse or if only a single line of data is acquired, it may be necessary to resort two a 2D approximation of A.

Note that in this method for source deghosting we have not included any information about the reflection coefficient of the surface.

We can also make use of one more equation that relates the ghost sources to the desired sources:

$$p^d = -Cp^g$$ (24)

where C is a redatuming operator that depends on the depth of the shallow sources $z_1$ but that is related to the above defined operators A and B and knowledge or assumptions concerning the reflection coefficient of the free surface reflector, e.g. the sea surface, and is −1 in equation (24):

$$C = A^{2z_1/\Delta z}.$$ (25)

Equations (16), (20), (24) and (25) therefore allow us to isolate the wavefields due to the (virtual) ghost sources and or the desired (physical) sources separately without knowing the redatuming operators A, B or C. In fact, the system of equations also allows to solve for the redatuming operator itself. Knowledge of such redatuming operators is important in many applications in seismic data processing such as in imaging of seismic data or in removing multiples in the data for instance. In this case, we obtain the following expression for the mix of desired and ghost sources that occur around k=0 (again denoted by $F^0$):

$$F^0 = -\frac{1}{2}[1 + A]A^{-2z_1/\Delta z}P^d + \frac{1}{2}[1 + A^{-1}]P^d.$$ (26)

The following expression for the mix of desired and ghost sources that occur around $k_N$ along the $k_x$-axis (again denoted by $F^N$):

$$F^N = -\frac{1}{2}[1 - A(\omega, k_x, k_y)]A^{-2z_1/\Delta z}P^d + \frac{1}{2}[1 - A^{-1}]P^d.$$ (27)

Equations (26) and (27) can be solved explicitly or iteratively for arbitrary values of $z_1$ and sources $\Delta z$ such that we no longer need any information about what the redatuming operator looks like and instead can solve for the desired wavefield due to the physical sources only, and or the wavefield due to the (virtual) ghost sources and or the redatuming operator.

Also in the source deghosting methods summarized above, for the direct deghosting by deblending to work it is required that the energy is contained in either a combination of a cone constraint such as (1) along with a condition such as $|\omega|<c/(4\Delta_x)$, or in a larger domain such as determined by (4). Again, improvements to these constraints can be obtained by various changes of coordinates and considering their effect on the deblending as shown above, and, in some cases, even by using NMO or parabolic moveout corrections without considering their effect on the deblending, but instead using the unmodified deblending expressions. Note that the cone-shaped supports or constraints and the related diamond-shaped constraints in the frequency-wavenumber domain take on other shapes and forms in other transform domains and it should be understood when we refer to the support or the constraints as being so shaped in the fk-domain that this includes using the corresponding other shapes and forms in the other well-known transform domains as generally used in seismic data processing.

Finally, note that in the following we also refer to virtual ghost sources as effective simultaneous sources, as opposed to real simultaneous sources which we reserve for separate physical sources.

Synchronous Shooting on General Related Sampling Grids

Following this summary of methods enabling acquisition and processing of perturbed and/or aliased simultaneous source or ghosted data, we present then, the new and/or improved methods for acquiring and separating simultaneous-source data acquired with general, but related sampling grids which increase the efficiency and/or the quality with which sources can be simultaneously acquired and separated. Key observations shaping the present invention are that: (1) no information about the relative source locations is required for encoding and decoding using the apparition principles described above, (2) no information about the source spatial sampling interval is required, other than for defining the support of the wave fields due to the individual sources relative to the Nyquist wavenumber (effective Nyquist wavenumber, in the case of irregular sampling), (3) the order in which the shot positions are traversed and activated is immaterial as long as all the sources traverse and activate at the shot positions in the same order, i.e., they acquire the source locations synchronously, and (4) that Fourier transforms for data sampled at regular locations are just one type of transform that possess shift (for periodic modulation) and cyclic convolution (for general aperiodic modulation) properties.

A Bravais grid in two dimensions is a set of points of the form $$B_A = \{Ak, k=(k_1,k_2) \in \mathbb{Z}^2\},$$

where A is a 2×2 matrix. Associated with this grid is the dual grid $$B_A^\perp = \{x \in \mathbb{R}^2 : <x,y> \in \mathbb{Z} \,\forall y \in B_A\}.$$

It can be verified that $$B_A^\perp = B_{A^{-T}},$$

Important examples include the regular quadratic grid for which $$A = \begin{pmatrix} 1 & 0 \\ 0 & 1 \end{pmatrix},$$

and the hexagon (rhombic) grid generated from $$A = \begin{pmatrix} \sqrt{3}/2 & 0 \\ -1/2 & 1 \end{pmatrix}.$$

We will describe how the apparition principle works for Bravais grids. First, note that from the standard rules of the Fourier transform it holds that $$f(A(x+b))e^{-2\pi i \langle \xi, x+b \rangle} \stackrel{\mathcal{F}}{\mapsto} \frac{1}{|\det(A)|} e^{2\pi i \langle b, \eta \rangle} \hat{f}(A^{-T}(\eta+\xi)).$$

Recall the two-dimensional Poisson sum formula $$\sum_{k \in \mathbb{Z}^2} f(k) = \sum_{n \in \mathbb{Z}^2} \hat{f}(n).$$

Using the Poisson sum formula in combination with the Fourier relation above, we have that $$\sum_{k \in \mathbb{Z}^2} f(A(k+b))e^{-2\pi i \langle \xi, k+b \rangle} = \frac{1}{|\det(A)|} \sum_{k \in \mathbb{Z}^2} e^{2\pi i \langle b, k \rangle} \hat{f}(A^{-T}(k+\xi)).$$

Now, let $l \in B_A$ and let $m \in B_A^\perp$. Each such element can thus be indexed as $l_k$ and $m_k$, respectively. Moreover, choose $$\xi_n = \left(\frac{n_1}{N_1}, \frac{n_2}{N_2}\right)$$

for $0 \le n_1 < N_1$ and $0 \le n_2 < N_2$ where $n_1$, $n_2$, $N_1$ and $N_2$ are non-negative integers. The Poisson sum can then be written $$\sum_{k \in \mathbb{Z}^2} f(l_k + Ab) e^{-2\pi i \left(\frac{n_1(k_1+b_1)}{N_1} + \frac{n_2(k_2+b_2)}{N_2}\right)} =$$

$$\frac{1}{|\det(A)|} \sum_{n \in \mathbb{Z}^2} e^{2\pi i \langle b, k \rangle} \hat{f}((m_k + A^{-T} \xi)).$$

We now introduce the notation $$m_n^N = A^{-T} \xi_n,$$

which allows us to rewrite the above relation as $$\sum_{k \in \mathbb{Z}^2} f(l_k + Ab) e^{-2\pi i \left(\frac{n_1(k_1+b_1)}{N_1} + \frac{n_2(k_2+b_2)}{N_2}\right)} = \frac{1}{|\det(A)|} \sum_{n \in \mathbb{Z}^2} e^{2\pi i \langle b, k \rangle} \hat{f}(m_k + m_n^N).$$

Note that if f has such compact support that $$f(l_k+b)=0,$$

if $$k \notin \{(n_1,n_2) \in \mathbb{Z}^2 : 0 \le n_1 < N_1, 0 \le n_2 < N_2\},$$

then the left hand sum above reduces to a regular two-dimensional discrete Fourier transform which can be rapidly evaluated using FFT.

We now turn our attention to the apparition setup. Let $P=\{(p_1, p_2) \in \mathbb{Z}^2 : 0 \le p_1 < P_1, 0 \le p_2 < P_2\}$ and let $N_P$ be equal to the number of elements in P. We will also use the notation $\mathrm{mod}_P$ to denote the modulus operator with respect to the set P.

Suppose that measurements are made using the $N_P$ functions $f_p : \mathbb{R}^3 \to \mathbb{R}$. Morever, let $h_p^q$ be $N_P^2$ filter functions, for instance time shift operators. We now assume that combinations of the $N_P$ functions $f_p$ are measured at grid points $$l_{k,q} = A(k+b), k \in \mathbb{Z}^2, b = \left(\frac{q_1}{P_1}, \frac{q_2}{P_2}\right), q = (q_1, q_2) \in P.$$

At each such point, linear combinations of the form $$d(k,p,t) = \sum_{p \in P} {}^{p \in P} (h_p^q * f_p(l_{k,p}, \cdot))(t),$$

are measured during the acquisition. A Fourier transformation with respect to the time variable thus gives $$\hat{d}^t(k, q, \omega) = \sum_{p \in P}^{p \in P} \hat{h}_p^q(\omega) \hat{f}_p^t(l_{k,p}, \omega),$$

and an additional Fourier series expansion of $\hat{d}^t$ yields $$\sum_{k \in \mathbb{Z}2} \sum_{q \in P} \hat{d}^t(k, q, \omega) e^{-2\pi i \left(\frac{n_1(P_1 k_1 + q_1)}{P_1 N_1} + \frac{n_2(P_2 k_2 + q_2)}{N_2 P_2}\right)} = \quad (28)$$

$$\sum_{k \in \mathbb{Z}2} \sum_{p,q \in P} \hat{h}_p^q(\omega) \frac{1}{|\det(A)|} \sum_{k \in \mathbb{Z}2} e^{2\pi i \left(\frac{q_1 k_1}{P_1} + \frac{q_2 k_2}{P_2}\right)} \hat{h}_p^q(\omega) \hat{f}_p(m_k + m_n^N) =$$

$$\sum_{k \in \mathbb{Z}2} \sum_{p,q \in P} \hat{h}_p^q(\omega) \frac{1}{|\det(A)|}$$

$$\sum_{k \in \mathbb{Z}2} e^{2\pi i \left(\frac{q_1 k_1}{P_1} + \frac{q_2 k_2}{P_2}\right)} \hat{h}_p^q(\omega) \hat{f}_p\left(A^{-T}\left(\frac{N_1 k_1 + n_1}{N_1}, \frac{N_2 k_2 + n_2}{N_2}\right)\right).$$

Assume now that all of $\hat{f}_p(\xi_1, \xi_2, \omega)$ for each fixed $\omega$ have support in some domain $\Omega$ such that the set $$\left\{A^{-T}\left(\frac{N_1 k_1 + n_1}{N_1}, \frac{N_2 k_2 + n_2}{N_2}\right) : 0 \le k_1 \le P_1,\right.$$

$$\left. 0 \le k_2 < P_2, 0 \le n_1 < N_1, 0 \le n_2 < N_2\right\}$$

can be mapped to some domain $\mathcal{D}$ such that $$\Omega \cap B_A^\perp \subset \mathcal{D}.$$

Specifically, this mean that there exists a mapping $\iota: \mathbb{Z}^4 \to \mathbb{Z}^2$ such that $$\mathcal{D} = \left\{A^{-T}\left(\frac{N_1(k_1 + \iota_1(k,n)) + n_1}{N_1}, \frac{N_2(k_2 + \iota_2(k,n)) + n_2}{N_2}\right) : 0 \le k_1 < P_1,\right.$$

$$\left. 0 \le k_2 < P_2, 0 \le n_1 < N_1, 0 \le n_2 < N_2\right\}.$$

In this case it follows that for each $\zeta \in \Omega \cap B_A^\perp$ it is possible to obtain $N_P$ linear equations for the $N_P$ unknowns $\hat{f}_p(\zeta, \omega)$ by a suitable (as above) remapping of the left hand expression of (28) with $n_1$ and $n_2$ varying over intervals of length $N_1 P_1$ and $N_2 P_2$, respectively.

Example

Hexagonal sampling: A simple example of apparition for hexagonal sampling is shown in FIG. 4. Here four functions are used, with the regular shift operators and $P_1 = P_2 = 2$. FIG. 4, top panel contains blended data in the Fourier domain; the lower panel the recovered four functions. The previous formalism can be made easier in this case.

Generalizations

The setup can be generalized by incorporating additional coordinate transformations. The simplest such class of transformations concerns individual affine maps for each of the functions. In this case the expression A in (28) is replaced by individual matrices $A_p$ as well as modulation factors corresponding to shifts in the affine maps. The relations (28) now still relate the Fourier transform of the encoded data d on a Bravais grid, with the Fourier transforms of the underlying functions $f_p$ on individual Bravais grids.

An even more general setup can be obtained by considering arbitrary coordinate transformations (diffeomorphisms) $R_p$ and consider samplings at grids of the type $R_p(k)$. Such grids could for instance include unintentional curvature caused in the acquisition process or for instance coil sampling. Instead of considering the functions $f_p$ directly, we can consider new functions of the form $$f_p(R_p(k)) = g_p(Ak).$$

The relation (28) can now be derived for the functions $g_p$. If the maps $R_p$ are mild in some sense (like in the cases mentioned above), then properties of support hold approximately (using essential support) for the remapped functions.

Thus, the term "synchronous shooting" or "synchronous activation" will be used in the context of: a way of acquiring data with multiple sources where the relative locations of the consecutive shots of each source trace out the same or an affinely transformed version of the spatial pattern (i.e., a grid), including Bravais sampling grids, as a function of time and where the sources are activated near-simultaneously and one or more source activation parameters are varied (a) periodically across the spatial pattern of shots.

Further, the term "multi-scale apparition" will be used in the context of: synchronous shooting but where the (regular) spatial pattern traced out as a function of time by the relative locations of consecutive shots of each of the sources is a scaled version of the (rotated or skewed) spatial pattern of the other sources.

Note that in synchronous shooting it is the relative locations of consecutive shots (not sources) that form the same or an affinely transformed version of the spatial pattern (or grid). Hence the shot positions of the individual sources will, in general, be different and the actual shot positions of one source can be related to the actual shot positions of another source by, in the more general case, affine transformations.

Similarly, for the case of multi-scale apparition, the actual shot positions of one source can be related to the actual shot positions of another source by affine transformations. Thus, multi-scale apparition in the following is only a special case of the more general case of synchronous acquisition of affinely related grids.

Some limited non-exhaustive list of examples of (regular) spatial patterns that can be used for synchronous shooting are: (1) Equidistant sampling with the sampling interval in y equal to the sampling interval in x, (2) Equidistant sampling with the sampling interval in y unequal to the sampling interval in x, (3) (intentionally) Irregular sampling, and (4) Hexagonal sampling.

For synchronous shooting, the offset vectors relating the synchronously acquired positions, or more generally the affine transformations relating the shot locations, determine the amount of overlap in the subsurface coverage ranging from:

(1) no offset, i.e. the simultaneous shots are on top of each other and the amount of overlap is 100%. With the exception of acquiring the grids using two or more different source depths, there is nothing to encode with the corresponding exception of the different source ghost responses as all source-receiver positions define the same 3D Green's function, to (2) small offsets on the order of $\Delta x/2 \sim \Delta y/2$, where $\Delta x$ and $\Delta y$ denote the inline shot spacing and the crossline line spacing, respectively. The simultaneous shots are on grids/patterns that are staggered with respect to each other by a small amount such as, e.g., half the inline and crossline shot spacing. In this case, clearly the shifts of the simultaneous sources are small compared to the extent (e.g., line length) of the shot pattern and all sources essentially still see the same subsurface. Reconstruction methods can be applied that take advantage of the fact that the sources see the same subsurface, to (3) large offsets on the order of $Lx \sim Ly$ where $Lx$ and $Ly$ denote, e.g., the shot line length and the crossline extent of all shotlines, respectively. In this case, the simultaneous shots are completely separated in terms of their midpoints and all sources see a different part of the full 3D Green's function and illuminate a different part of the subsurface. No overlap can be exploited and the number of unknowns not reduced. On the other hand, this type of acquisition is the most efficient way to acquire, e.g., a 3D common receiver gather in part or in full.

Kx-Ky Space-Filling Multi-Scale Apparition

One advantageous aspect of the generalised apparition methods and equations described above for the cases where the sampling grids are related by affine transformations and/or are Bravais grids, is now illustrated in more detail, namely, the ability better fill the available (empty) Kx-Ky space by choosing suitably scaled (and offset/rotated/skewed) versions of the related source sampling grids. This is illustrated in FIGS. 5-13, where synthetic simultaneous source data are generated for a model with 64 point diffractors embedded in a homogeneous 3D background model (propagation velocity c=1500 m/s). Four sources are acquired simultaneously over the diffractors with regular equispaced shot grids.

Figure 5:
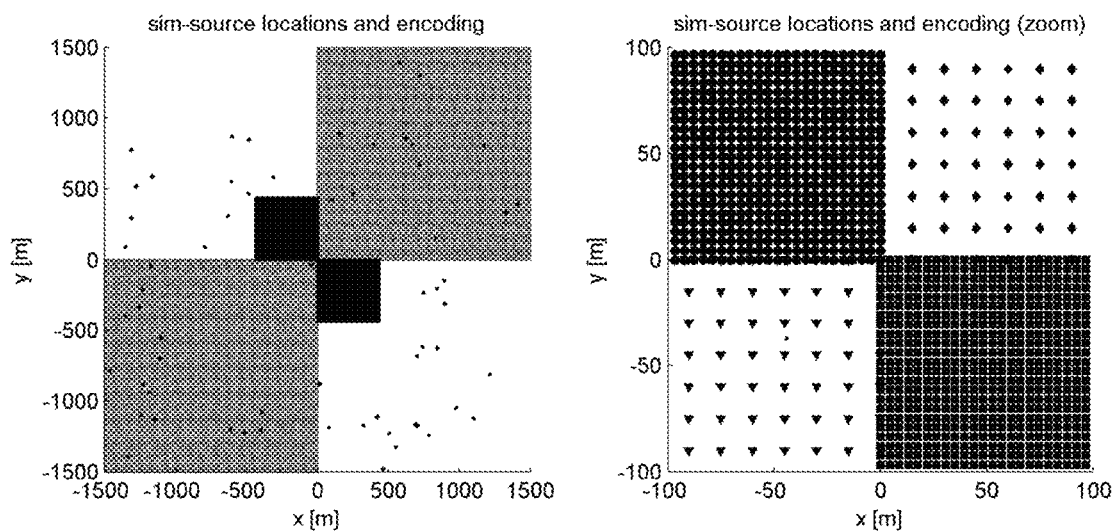
FIG. 5 (left panel) shows the shot location grids for four simultaneous sources and the location of 64 point diffractors in a subsurface model, and the right panel shows a zoom-in on the shot location grids around the origin. Two of the sources acquire their shot locations with one grid spacing while the other two sources acquire their sources with different grid spacing.

FIG. 5 Left panel shows the shot location grids for four simultaneous sources and the location of 64 point diffractors in a subsurface model. Right panel shows a zoom-in on the shot location grids around the origin. Two of the sources acquire their shot locations with one grid spacing while the other two sources acquire their sources with a different grid spacing.

The shot spacing of the shot grids associated with sources two and three is $(1-sqrt(2)/2)/(sqrt(2)/2) \sim 0.4145$ times smaller than the scale and shot spacing of the shot grids associated with sources one and four.

Figure 6:
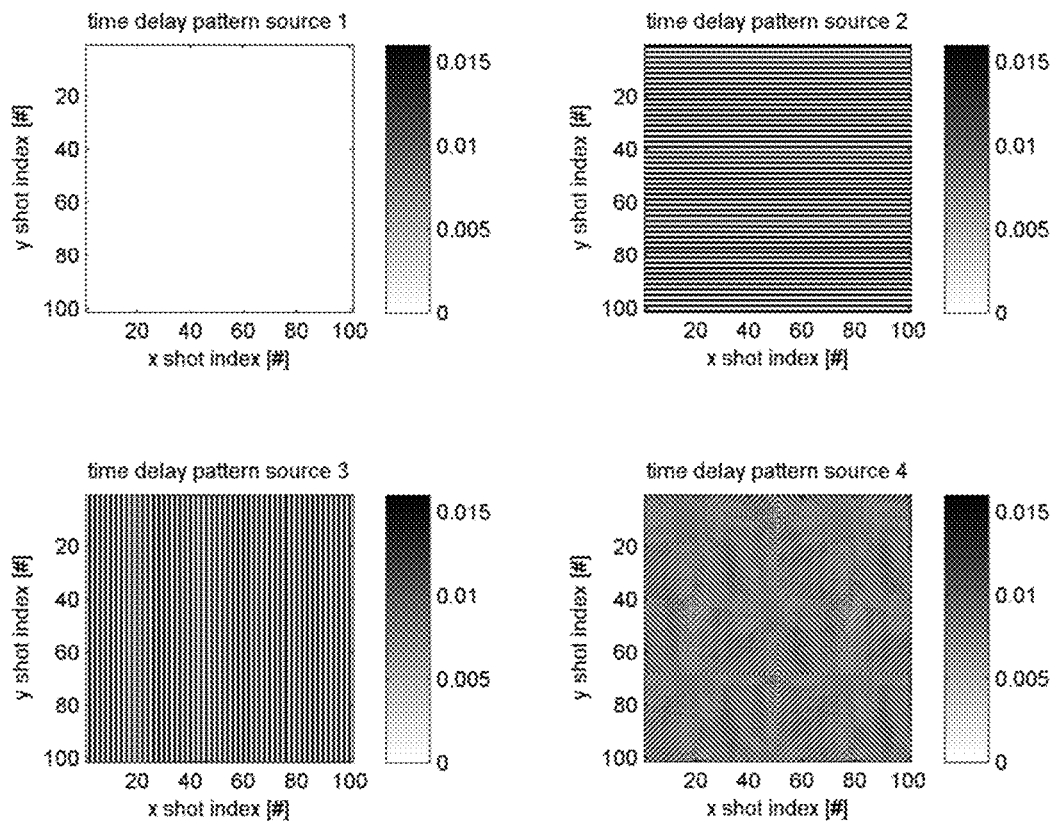
FIG. 6 shows the encoding time delays for the shot locations in the shot location grids of each of the four simultaneous sources of FIG. 5.

FIG. 6 shows the encoding time delays for the shot locations in the shot location grids of each of the four simultaneous sources of FIG. 5. The 2D modulation functions (specifically, the time delays applied to each of the sources once they simultaneously reach a particular shot point) are shown in Figure Y.

Note that without changing the scale (shot spacing) of the shot grids, and assuming that source wavefields all occupy the same bandwidth, then aliasing occurs when the apparated part of the signal cone of sources two and three starts to overlap the unapparated part of these sources and the unapparated source one. On the other hand, at that frequency, it is clear that the apparated part of the signal cone of source 4, which has been apparated to the corners of the Kx-Ky domain, is not yet overlapping with the unapparated part of source 4, nor with the unapparated source one. This is because the diagonal is a factor sqrt(2) longer and overlapping of sources 4 and 1 therefore occurs at a proportionally higher frequency. Thus, it is advantageous if we can reduce the relative bandwidth occupied by the sources two and three. This is possible using multi-scale apparition and indeed is the reason for the different scales (shot spacings) in FIG. 6. By decreasing the spacing for shots, and hence the scale of the shotgrids, two and three, we can create a situation where the wavefields from these sources occupy exactly the remaining space in the Kx-Ky at the aliasing frequency for apparated source 4 and unapparated source 1. This is illustrated in detail in FIG. 7.

Figure 7:
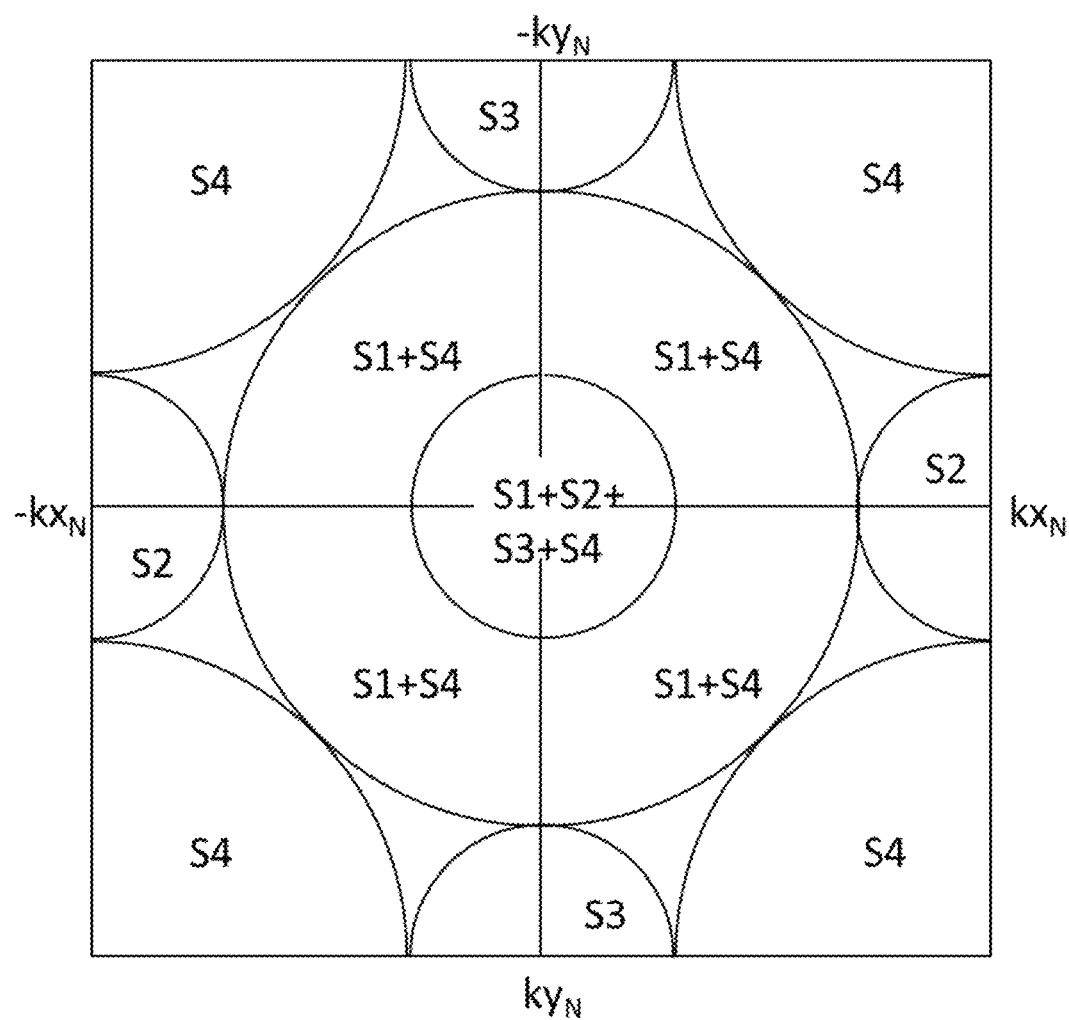
FIG. 7 shows the regions of the inline-crossline (Kx-Ky) horizontal wavenumber domain that each of the four sources of FIG. 5 map into after encoding the shots with the the encoding time delays of FIG. 6 and using the different (smaller) scales (grid spacings) for sources 2 and 3 compared to the scales (grid spacings) used for sources 1 and 4.

FIG. 7 Shows the regions of the inline-crossline (Kx-Ky) horizontal wavenumber domain that each of the four sources of FIG. 5 map into after encoding the shots with the the encoding time delays of FIG. 6 and using the different (smaller) scales (grid spacings) for sources 2 and 3 compared to the scales (grid spacings) used for sources 1 and 4. Source one is not apparated. Source four is apparated to the corners. Sources two and three are apparated to the +/−KxN and +/−KyN, respectively.

Kx-Ky Space-Filling Multi-Scale Apparition Results

Figure 8:
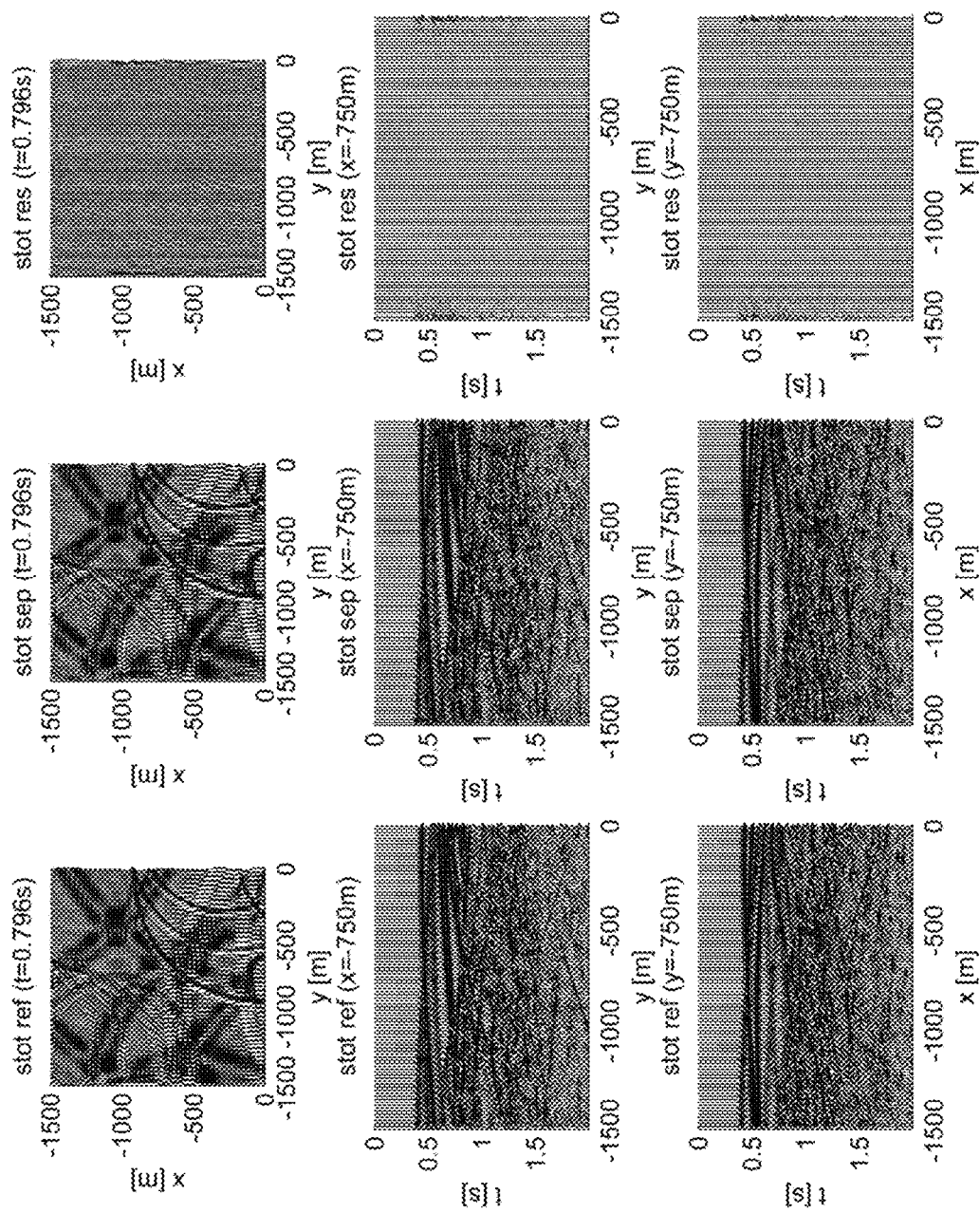
FIG. 8 shows three slices (top, middle, bottom) through the 3D volume of synthetic simultaneous source data modeled for the four sources and their shot locations in FIG. 5, encoded using the time delays of FIG. 6, simultaneously shooting into a single receiver at the origin above a model with 64 point scatterers (left column). In the middle column, the same three slices of the separated, remodeled data are shown. In the right column, the residual (i.e., the unmodeled part of the total simultaneous source wavefield) is shown.
Figure 13:
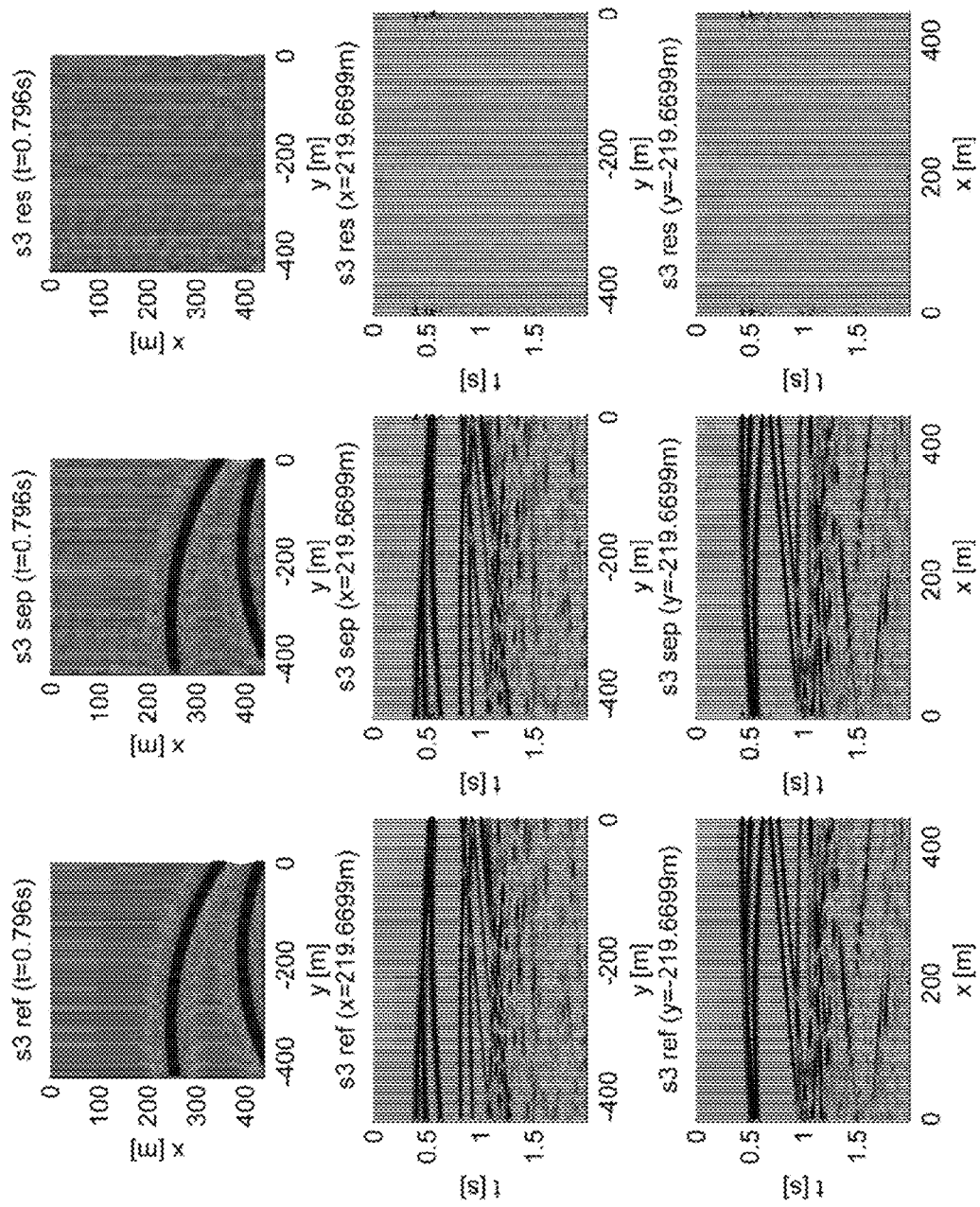
FIG. 13 shows three slices (top, middle, bottom) through the 3D volume of synthetic simultaneous source data modeled for the third source and its shot locations in FIG. 5, activated independently and without encoding time delays, shooting into a single receiver at the origin above a model with 64 point scatterers (left column), and in the middle column, the same slices are shown for the separated data, while in the right column, the difference between the modeled (reference) and separated data for the third source is shown.

In the FIGS. 8,12,13, repeatedly three slices from 3D volumes of t,x,y data are shown. In all cases, the top panel is a time slice at t=0.796s, whereas the middle panel is a t-y slice at the central x position of the corresponding shot grid, and the bottom panel is a t-x slice at the central y position of the corresponding shot grid. Note that for the simultaneous source (remodeled) input data and residual, the shot positions from source one are shown for reference.

Figure 9:
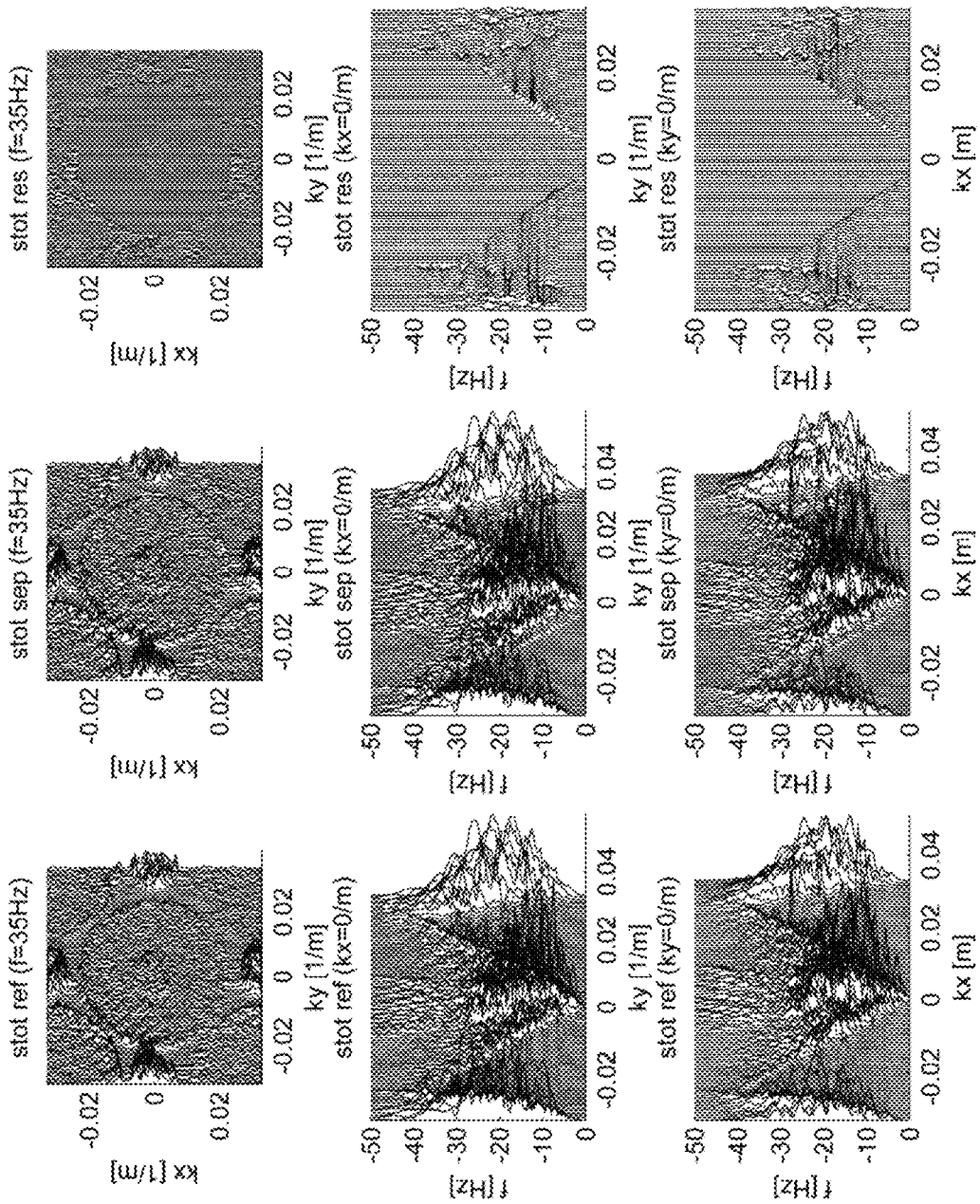
FIG. 9 shows three slices (top, middle, bottom) through the 3D volume of the frequency-inline-crossline (F-Kx-Ky) wavenumber amplitude spectrum of the synthetic simultaneous source data modeled for the four sources and their shot locations in FIG. 5, encoded using the time delays of FIG. 6, simultaneously shooting into a single receiver at the origin above a model with 64 point scatterers (left column), and in the middle column, the same slices are shown of the separated, remodeled data, while in the right column, the residual (i.e., the unmodeled part of the total simultaneous source wavefield) is shown.
Figure 10:
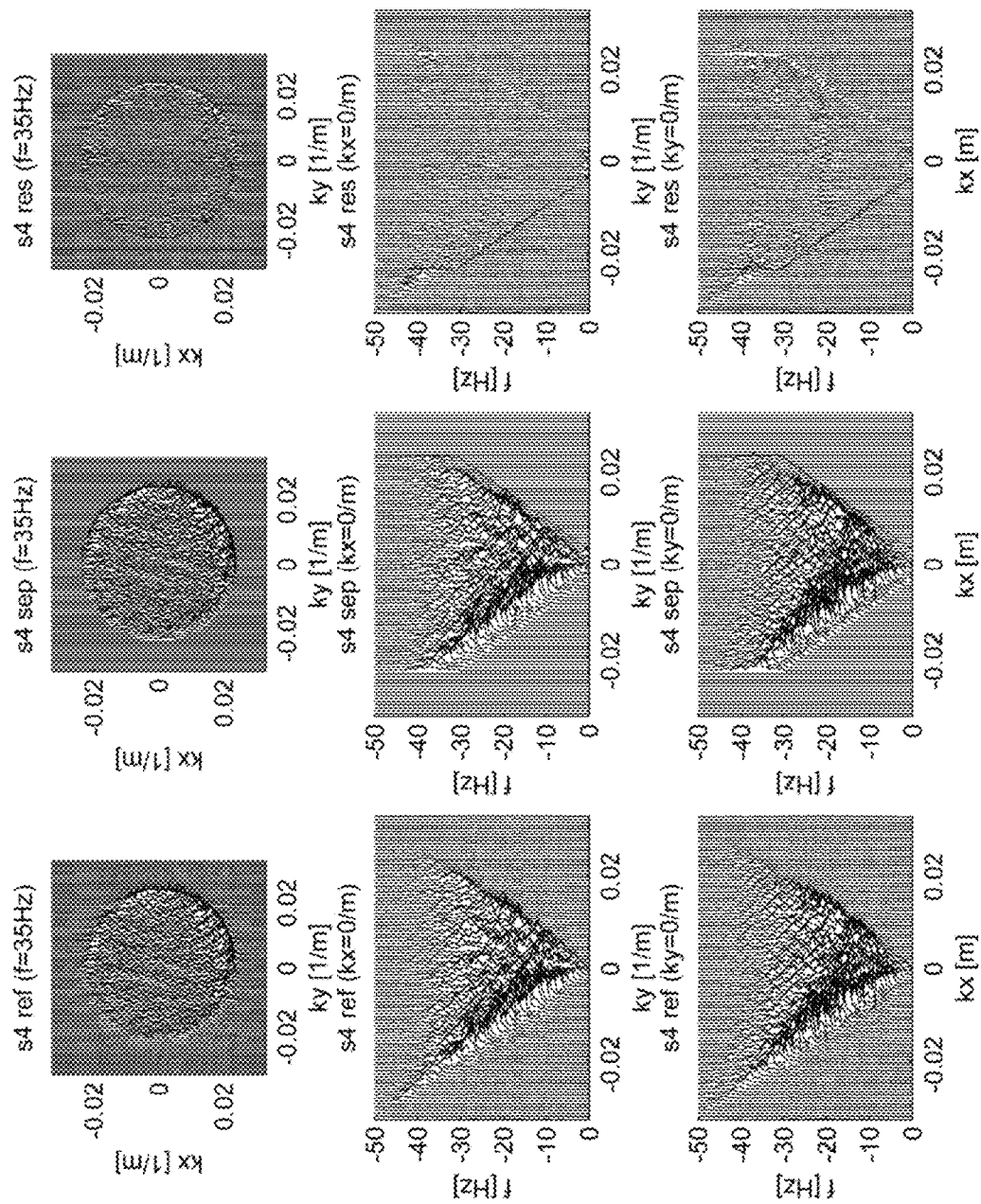
FIG. 10 shows three slices (top, middle, bottom) through the 3D volume of the frequency-inline-crossline (F-Kx-Ky) wavenumber amplitude spectrum of the synthetic simultaneous source data modeled for the fourth source and its shot locations in FIG. 5, activated independently and without encoding time delays, shooting into a single receiver at the origin above a model with 64 point scatterers (left column), and in the middle column, the same slices are shown for the separated data, while in the right column, the difference between the modeled (reference) and separated data for the fourth source is shown.
Figure 11:
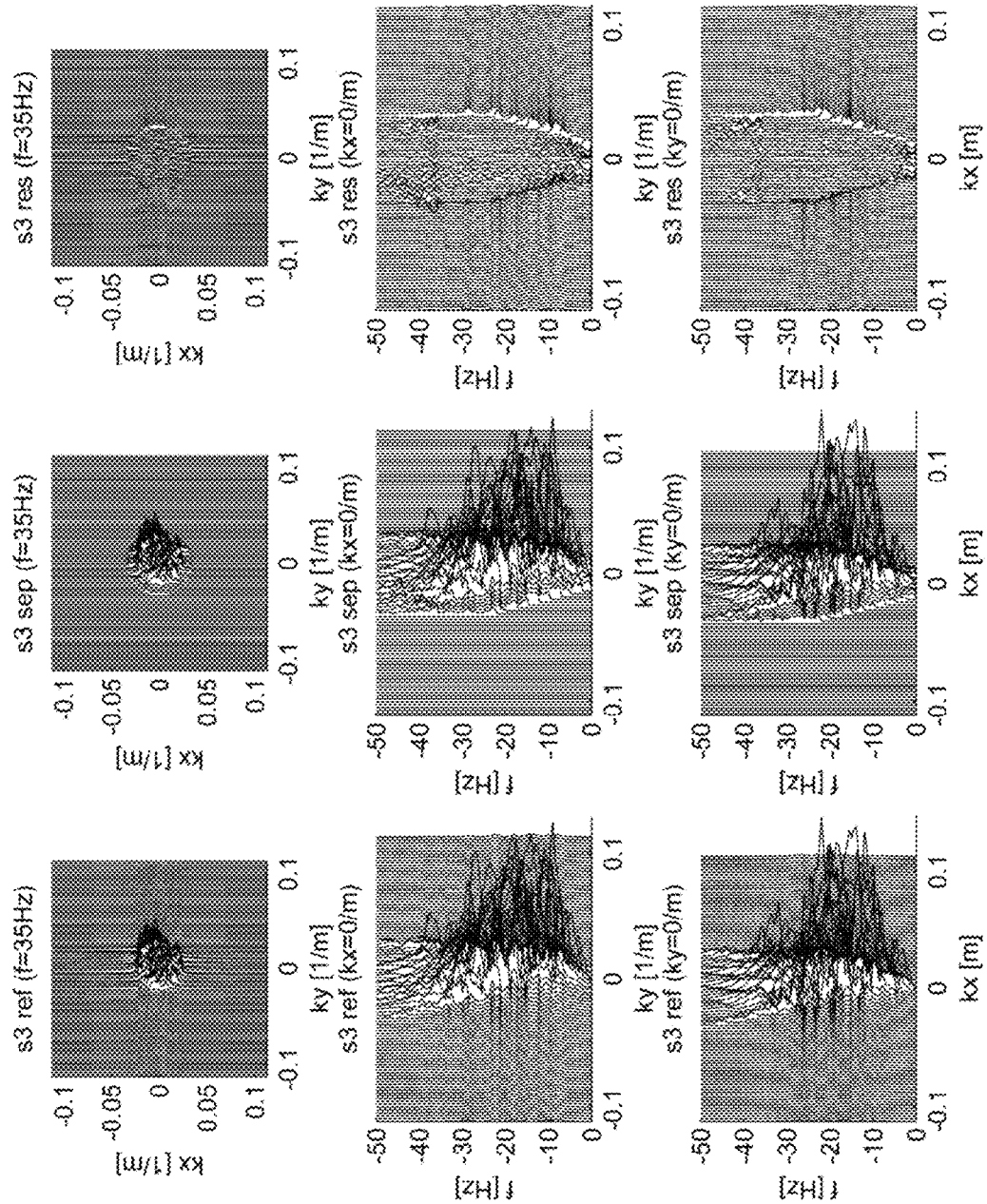
FIG. 11 shows three slices (top, middle, bottom) through the 3D volume of the frequency-inline-crossline (F-Kx-Ky) wavenumber amplitude spectrum of the synthetic simultaneous source data modeled for the third source and its shot locations in FIG. 5, activated independently and without encoding time delays, shooting into a single receiver at the origin above a model with 64 point scatterers (left column), and in the middle column, the same slices are shown for the separated data, while in the right column, the difference between the modeled (reference) and separated data for the third source is shown.

In the FIGS. 9-11, repeatedly three slices from 3D volumes of F,Kx,Ky data are shown (amplitude spectra). In all cases, the top panel is a frequency slice at f=35 Hz, whereas the middle panel is a F-Ky slice at Kx=0/m, and the bottom panel is a F-Kx slice at Ky=0/m. Note that for the simultaneous source (remodeled) input data and residual, the wavenumber axes from source one are shown for reference.

FIG. 8 Shows three slices (top, middle, bottom) through the 3D volume of synthetic simultaneous source data modeled for the four sources and their shot locations in FIG. 5, encoded using the time delays of FIG. 6, simultaneously shooting into a single receiver at the origin above a model with 64 point scatterers (left column). In the middle column, the same three slices of the separated, remodeled data are shown. In the right column, the residual (i.e., the unmodeled part of the total simultaneous source wavefield) is shown. Note the low residual, indicating that the separated source model the input data very closely.

FIG. 9 Shows three slices (top, middle, bottom) through the 3D volume of the frequency-inline-crossline (F-Kx-Ky) wavenumber amplitude spectrum of the synthetic simultaneous source data modeled for the four sources and their shot locations in FIG. 5, encoded using the time delays of FIG. 6, simultaneously shooting into a single receiver at the origin above a model with 64 point scatterers (left column).

In the middle column, the same slices are shown of the separated, remodeled data. In the right column, the residual (i.e., the unmodeled part of the total simultaneous source wavefield) is shown.

In the frequency slices of FIG. 9, one can see the effect of multi-scale apparition where the wavefields due to sources 2 and 3 are mapped, due to their smaller scale (shot spacing) into the remaining space in the Kx-Ky domain left after apparating source 4 and the unapparated source 1. One can also note the low values (close to zero) in the amplitude spectrum of the residual (right column).

FIG. 10 Shows three slices (top, middle, bottom) through the 3D volume of the frequency-inline-crossline (F-Kx-Ky) wavenumber amplitude spectrum of the synthetic simultaneous source data modeled for the fourth source and its shot locations in FIG. 5, activated independently and without encoding time delays, shooting into a single receiver at the origin above a model with 64 point scatterers (left column). In the middle column, the same slices are shown for the separated data. In the right column, the difference between the modeled (reference) and separated data for the fourth source is shown.

FIG. 11 Shows three slices (top, middle, bottom) through the 3D volume of the frequency-inline-crossline (F-Kx-Ky) wavenumber amplitude spectrum of the synthetic simultaneous source data modeled for the third source and its shot locations in FIG. 5, activated independently and without encoding time delays, shooting into a single receiver at the origin above a model with 64 point scatterers (left column). In the middle column, the same slices are shown for the separated data. In the right column, the difference between the modeled (reference) and separated data for the third source is shown.

Comparing FIGS. 10 and 11, the relative bandwidth occupied by the different sources four and three is very clearly visible. The relative bandwidth occupied by source three is significantly lower due to the reduced scale (i.e. shot spacing) of the grid.

FIG. 12 Shows three slices (top, middle, bottom) through the 3D volume of synthetic simultaneous source data modeled for the fourth source and its shot locations in FIG. 5, activated independently and without encoding time delays, shooting into a single receiver at the origin above a model with 64 point scatterers (left column). In the middle column, the same slices are shown for the separated data. In the right column, the difference between the modeled (reference) and separated data for the fourth source is shown.

FIG. 13 Shows three slices (top, middle, bottom) through the 3D volume of synthetic simultaneous source data modeled for the third source and its shot locations in FIG. 5, activated independently and without encoding time delays, shooting into a single receiver at the origin above a model with 64 point scatterers (left column). In the middle column, the same slices are shown for the separated data. In the right column, the difference between the modeled (reference) and separated data for the third source is shown.

Comparing FIGS. 12 and 13, the different scales at which the wavefield has been sampled are clearly visible, especially in the time slices. The separations shown in FIG. 10-13 show low error indicating that the sources relative bandwidth of the sources has been modeled accurately and the separation problem, due to the more parsimonious filling of the Kx-Ky domain, has become well-posed for the entire F-Kx-Ky domain at least until 35 Hz.

Double Encoding Acquisition and Double Decoding Processing

Novel methods have been described herein for simultaneous source separation and for source deghosting. We now describe how both simultaneous source separation and source deghosting can be achieved on single dataset (e.g. common receiver gather for a single shot line) by acquiring the data in a specific and advantageous manner. Consider two sources S1 and S2 at different depths $z1$ and $z2$ where S2 is encoded according to seismic apparition principles (for example: every first of two consecutive shots, S1 and S2 are activated simultaneously whereas every second of two consecutive shots S2 is activated with a variation as described herein, e.g., with a time delay of 10 ms with respect to the activation time of S1). Using the methods described herein, the data from S1 and S2 can be separated. Traces from the separated data, which still have free-surface reflections or ghosts in them, can then be interleaved in such a manner that the previously described source deghosting method can be applied. More specifically, as an example, one can interleave all the odd traces from the separated S1 data and all the even traces from the S2 data, resulting in a dataset with varying source depth, on which the deghosting method can be applied.

Figure 14:
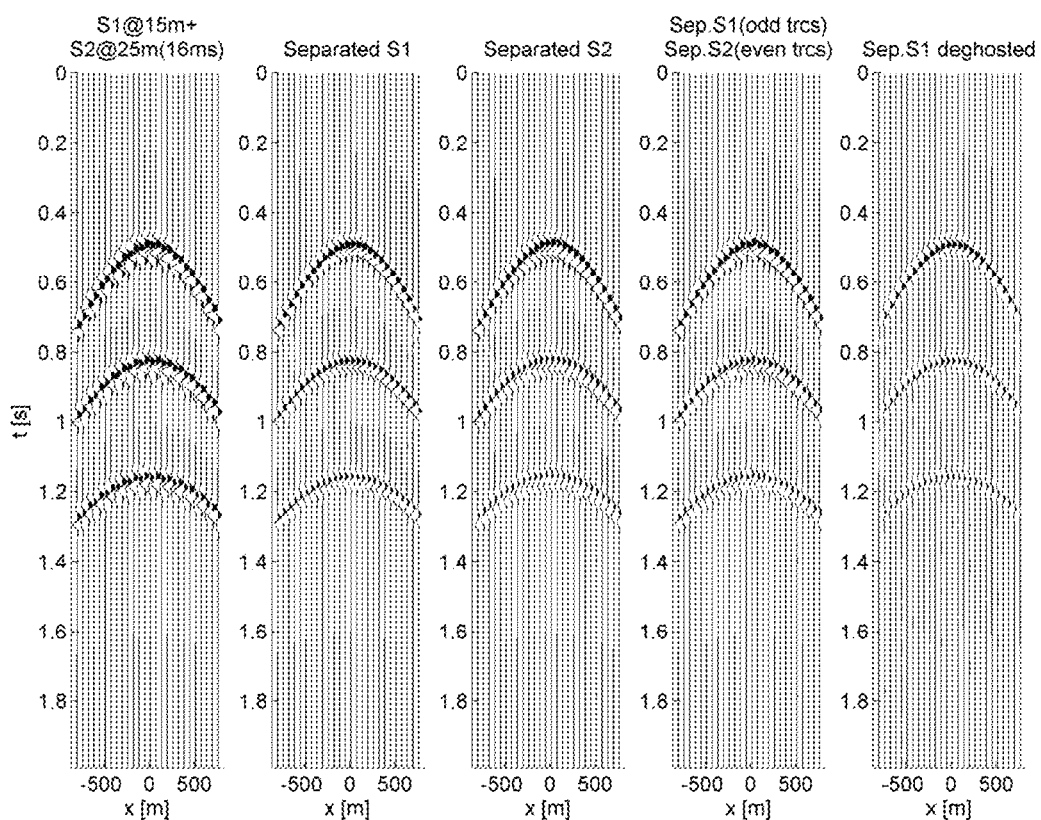
FIG. 14 shows synthetic ghosted simultaneous source data modeled for a simple three-reflector model, with the sources shooting into a single receiver and doubly encoded and the results after decoding the first encoding ($2^{nd}$ and $3^{rd}$ panel from the left), resorting ($4^{th}$ panel from the left) and the deghosted result after decoding the second encoding ($5^{th}$ panel from the left).

An example is shown in FIG. 14 for a simple 3 reflector model. Source S1 is activated at 15 m depth and source S2 is activated at 25 m depth. Every first of two consecutive shots, S2 is activated simultaneously with S1. Every second of two consecutive shots, S2 is activated 16 ms following S1. Every fifth trace of the simultaneous source input data is shown in the leftmost panel. In the 2nd and 3rd panels from the left, the separated S1 and S2 data are shown, respectively. In the 4th panel from the left, the even traces are taken from the separated S2 data and interleaved with the odd traces from the separated S1 data. Source deghosting according to the method described previously is applied to this data and the resulting deghosted S1 data are shown in the 5th panel from the left.

This example demonstrates how seismic apparition principles can be combined in a single acquisition, with source deghosting principles resulting in broadband data. More importantly, it shows how data can be double encoded and decoded with a particular acquisition and processing scheme. Variations of these methods may be derived, as well as further benefits may be obtained by performing the sim-source separation and the source-side deghosting jointly. Next, we disclose another acquisition and processing method where the data are double encoded and can be double decoded.

As another embodiment of double (or more) encoding and double (or more) decoding, consider an acquisition with three sources where the first source S1 is positioned half the inline shot spacing in front of the second source S2, and the third source S3 has an arbitrary crossline offset from the second source. In this particular embodiment, S2 and S3 are always activated at the same time. On every first of two consecutive shots, S2 and S3 are (jointly) activated simultaneously with S1 and on every second of two consecutive shots, S2 and S3 are (jointly) activated, e.g., 12 ms after S1. As, S2 and S3 are jointly encoded relative to S1 using apparition principles, they can be separated from S1 using the techniques described earlier. Then, interleaving the traces from the separated S1 and S2+S3 datasets, it is clear that S1 and S2 form a shotline that is twice as densely sampled compared to the shot spacing with which the simultaneous source data was acquired. On the other hand, every second trace still consists of a superposition of S2 and S3 and it is advantageous to realize that this new dataset corresponds to another case of seismic apparition type simultaneous source acquisition, namely where the S3 source is amplitude encoded relative to the interleaved separated S1 and S2 sources with encoding function A=0 on every first of two consecutive shots. In such a case, we will use the terminology that S3 is encoded implicitly. Thus, S3 can be separated from the interleaved separated S1 and S2 sources, yielding another dataset that can be used for processing. Once again, further benefits may be derived from performing the two decoding steps jointly.

The above methods show how different levels of encoding and decoding using apparition principles may be applied in a layered or recursive fashion, where the result of one decoding is possible following another decoding.

Improving Crossline Sampling by Inline Apparition

In many cases, in marine seismic acquisition, the crossline source sampling is poor compared to the inline source sampling. In the following, we disclose two methods that take advantage of a denser inline shot spacing, to improve the crossline source sampling.

It is advantageous to select the inline shot spacing such that it at least more than two times denser than the crossline shot line spacing. In the following, we describe, without loss of generality the case when the inline shot spacing is around four times denser than the crossline line spacing (e.g., inline shot spacing of 12.5 m, crossline shot line spacing of 50 m). Inline apparition can then be used to simultaneously acquire two parallel shot lines and perfectly separate these in processing up to a temporal frequency corresponding to half the aliasing frequency of the unencoded data. Thus, if the 12.5 m spacing aliases a horizontally propagating wave at 60 Hz, inline apparition decodes the data perfectly up to at least 30 Hz. On the other hand, since the shot line spacing in the crossline direction was 50 m, a horizontally propagating wave propagating purely in the crossline direction will alias already at 15 Hz. An important realization is that the decoding of inline apparated data also decodes any energy propagating in the crossline direction perfectly between 15 and 30 Hz. So although the crossline line spacing of 50 m still aliases such crossline propagating energy between 15 and 30 Hz, we can obtain using the inline apparition technique, at twice as many shot lines in the crossline direction and completely overcome the crossline aliasing between 15 and 30 Hz.

Reconstructing a Single Underlying Function

It is clear that the complete crossline dealiasing between 15 and 30 Hz is achieved when using the inline apparition technique to acquire shot lines exactly in between the shots lines spaced every 50 m. On the other hand, this is not the only way to achieve this. The simultaneous shot lines might be offset a small amount in the crossline direction, resulting in effective crossline gradient measurements which could be used in a crossline multi-channel interpolation. Alternatively, the simultaneous shot lines can, when all taken together, be understood as a filtered (shifted) and decimated version of an underlying unaliased signal. Multiple of such filtered (shifted) and decimated versions can be reconstructed using the well-known Generalized sampling expansion by Papoulis (1977). Finally, if the simultaneous shot lines are not regularly sampled in crossline, irregularly spaced Fourier transforms or spectral reconstruction techniques may be used to de-alias the sim-source separated data in the crossline direction.

It should be noted that the above description very much is adopting a worst case analysis and that by applying various of the de-aliasing techniques described herein, one can reconstruct signals to much higher frequencies than half the original aliasing frequencies. In such cases, it may also be advantageous to adopt data-driven de-aliasing techniques such as the Anti-Leakage Fourier Transform (Xu et al., 1995) in the crossline direction to reduce the crossline aliasing by more than a factor of two.

One embodiment will now be described in more detail, including with a workflow. The idea is to use closely located sources and seismic apparition for estimating source derivatives and sources at sparse samples. From the (e.g., low-pass filtered) derivatives we can estimate the directional interpolation vector field to interpolate the data. We need to de-alias the measured data as well. Up to the Nyquist sampling rate of the un-apparated data. This can be done in two steps: 1. Estimate directional interpolation vector field from low-frequency data. 2. Obtain local shifts (in both source and receiver coordinates). 3. Partition the data in smaller domains (using a partition of unity). On these domains, use constant (local) shift parameters in the source and receiver coordinates. 4. Include the shifts in the apparition setup to only recover one function. The derivative information is now captured in the shifts. 5. Reconstructions can then be made at the original sampling rate in the source coordinate. Following this we can then recover higher frequency content using the directional interpolation vector field in a similar way as is described for the directional de-aliasing. This procedure can also be iterated and/or combined with (Normal) Moveout corrections for broadening the frequency ranges. These ideas can also be used in combination with conventional sim-source separation methods where incoherency exploited in the separation instead of apparition. In addition, these methods can be applied both inline and crossline.

Multi-Dimensionality and Separation in Higher Dimensional Spaces

The methods described herein have mainly been illustrated using so-called common receiver gathers, i.e., all seismograms recorded at a single receiver. Note however, that these methods can be applied straightforwardly, after (local) transforms over one or more receiver coordinates, to individual or multiple receiver-side wavenumbers. Processing in such multi-dimensional or higher-dimensional spaces (i.e., higher than, e.g., the F,Kx,Ky space described previously) is known to reduce aliasing or overlapping issues, as the empty space increases dramatically relative to the bandwidth occupied by the seismic signals.

We note that further advantages may derive from applying the current invention to three-dimensional shot grids instead of two-dimensional shot grids, where beyond the x- and y-locations of the simultaneous sources, the shot grids also extend in the vertical (z or depth) direction. Furthermore, the methods described herein could be applied to different two-dimensional shot grids, such as shot grids in the x-z plane or y-z plane. The vertical wavenumber is limited by the dispersion relation and hence the encoding and decoding can be applied similarly to 2D or 3D shotgrids which involve the z (depth) dimension, including by making typical assumptions in the dispersion relation, e.g., in the 2D case, such as Ky=0/m (when acquiring, e.g., shot grids in the x-z plane).

Decoding after/During Imaging or Migration

The above discussion on separation after (local) transforms over one more receiver coordinates also makes it clear that seismic apparition principles can be applied in conjunction with and/or during the imaging process: using one-way or two-way wavefield extrapolation methods one can extrapolate the recorded receiver wavefields back into the subsurface and separation using the apparition principles described herein can be applied after the receiver extrapolation. Alternatively, one could directly migrate the simultaneous source data (e.g., common receiver gathers) and the apparated part of the simultaneous sources will be radiated, and subsequently extrapolated, along aliased directions, which can be exploited for separation (e.g. by recording the wavefield not in a cone beneath the sources, but along the edges of the model).

Source Configurations and Types

Figure 15:
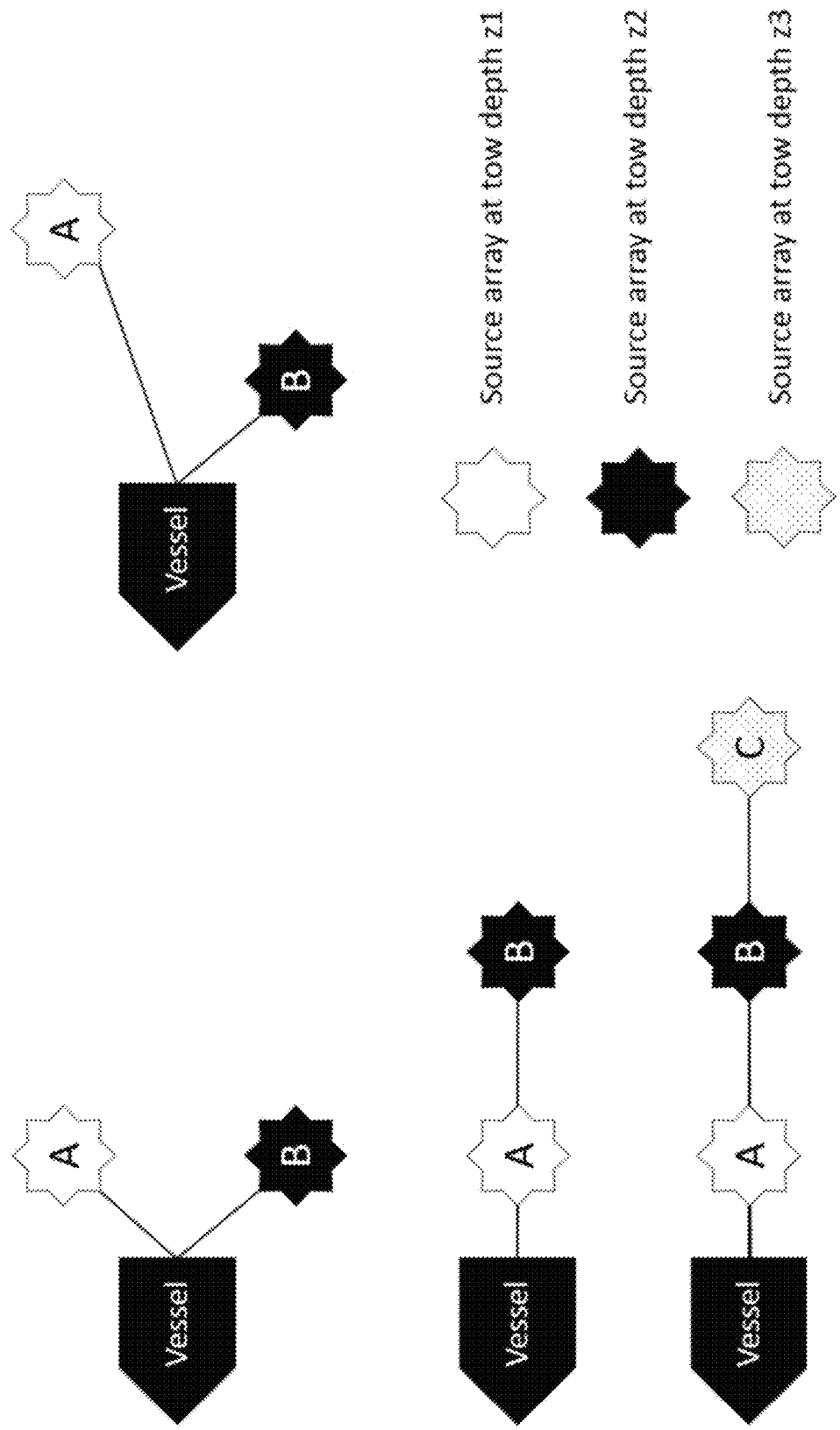
FIG. 15 discloses methods for towing of source arrays at different tow depths but offset to each other.
Figure 16:
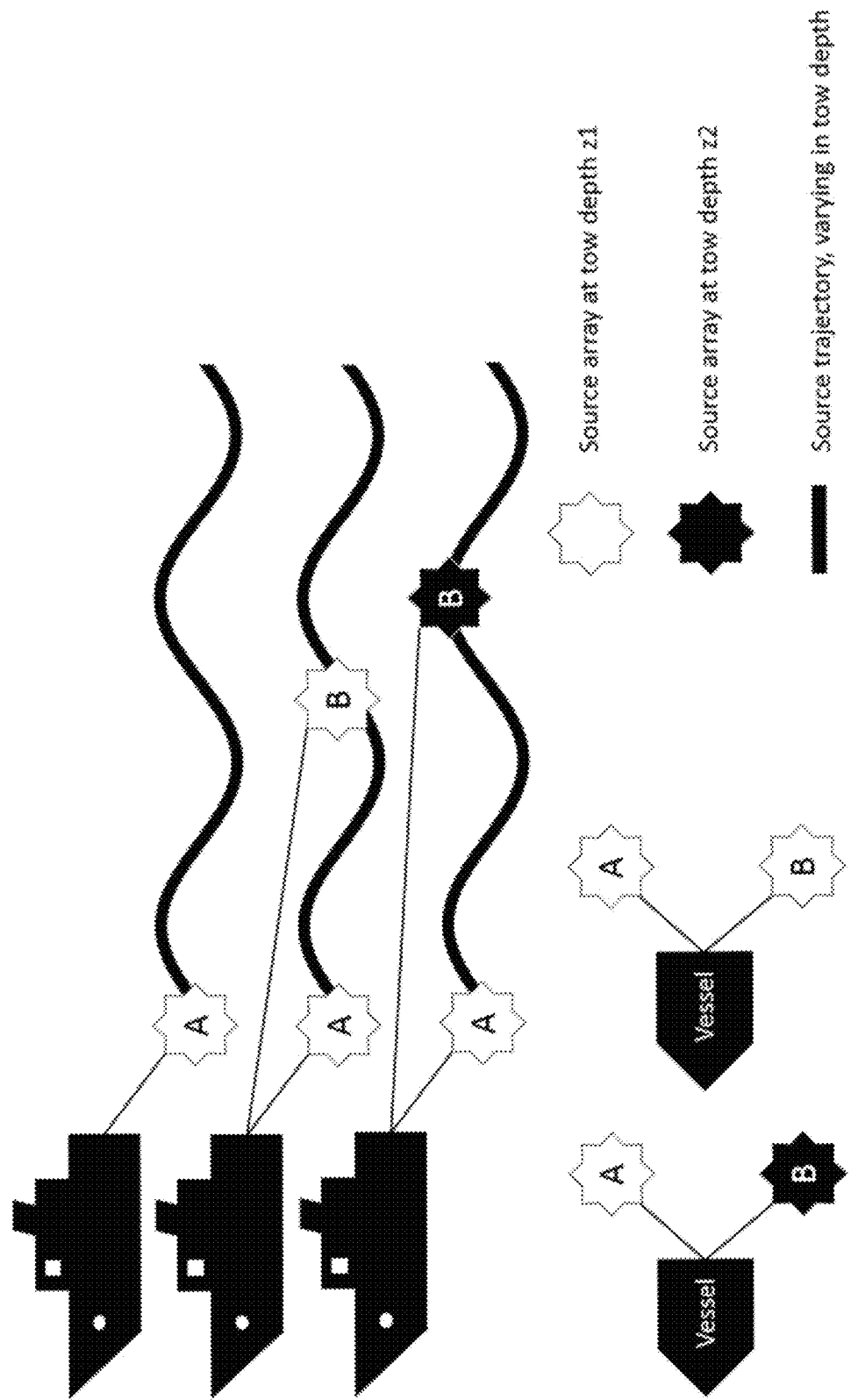
FIG. 16 discloses various configurations for towing one or more source arrays at varying or alternating tow depths.
Figure 17:
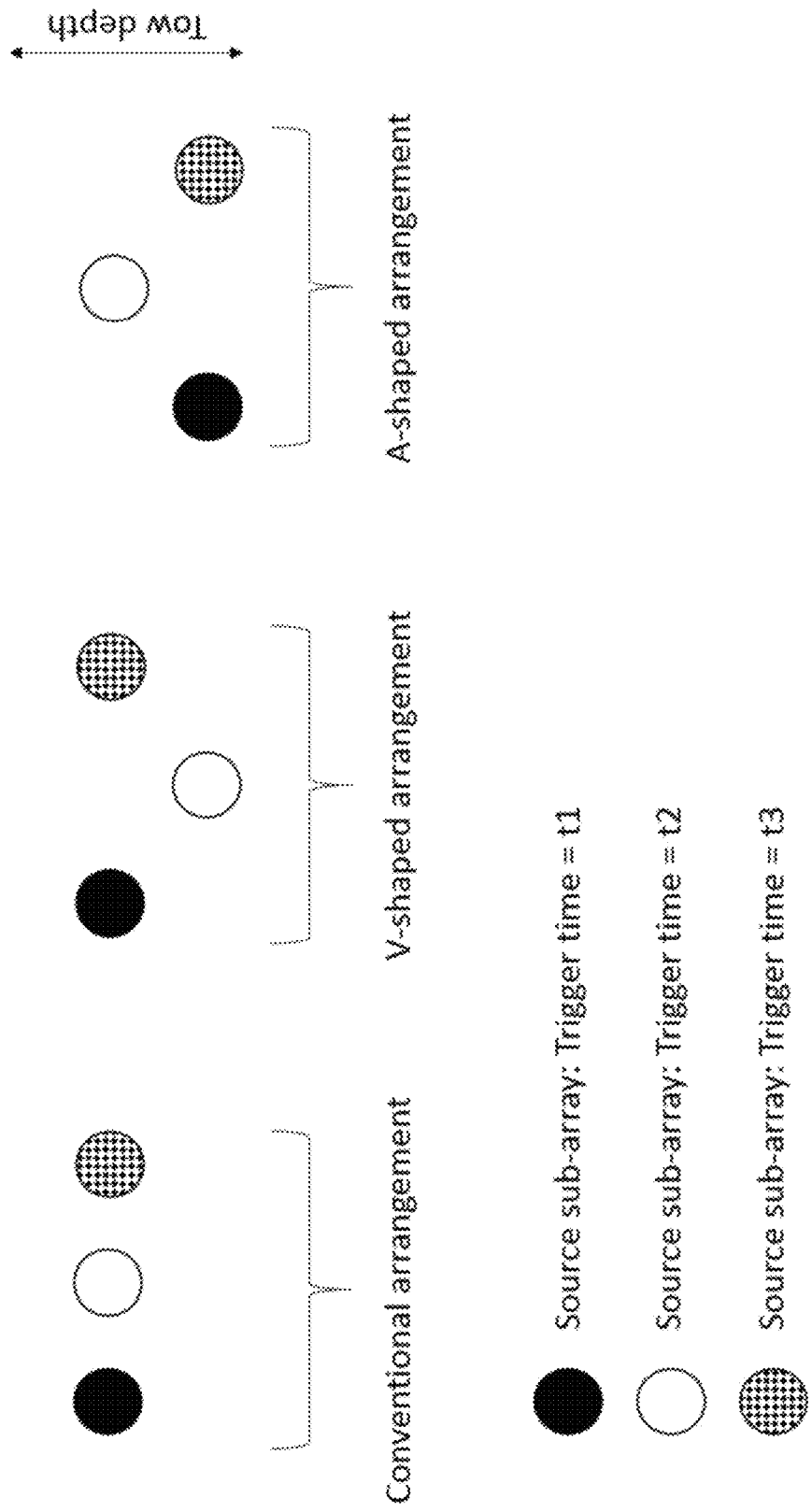
FIG. 17 discloses sub-arrays of a seismic source array that are towed at different depth levels encoded using seismic apparition principles.
Figure 18:
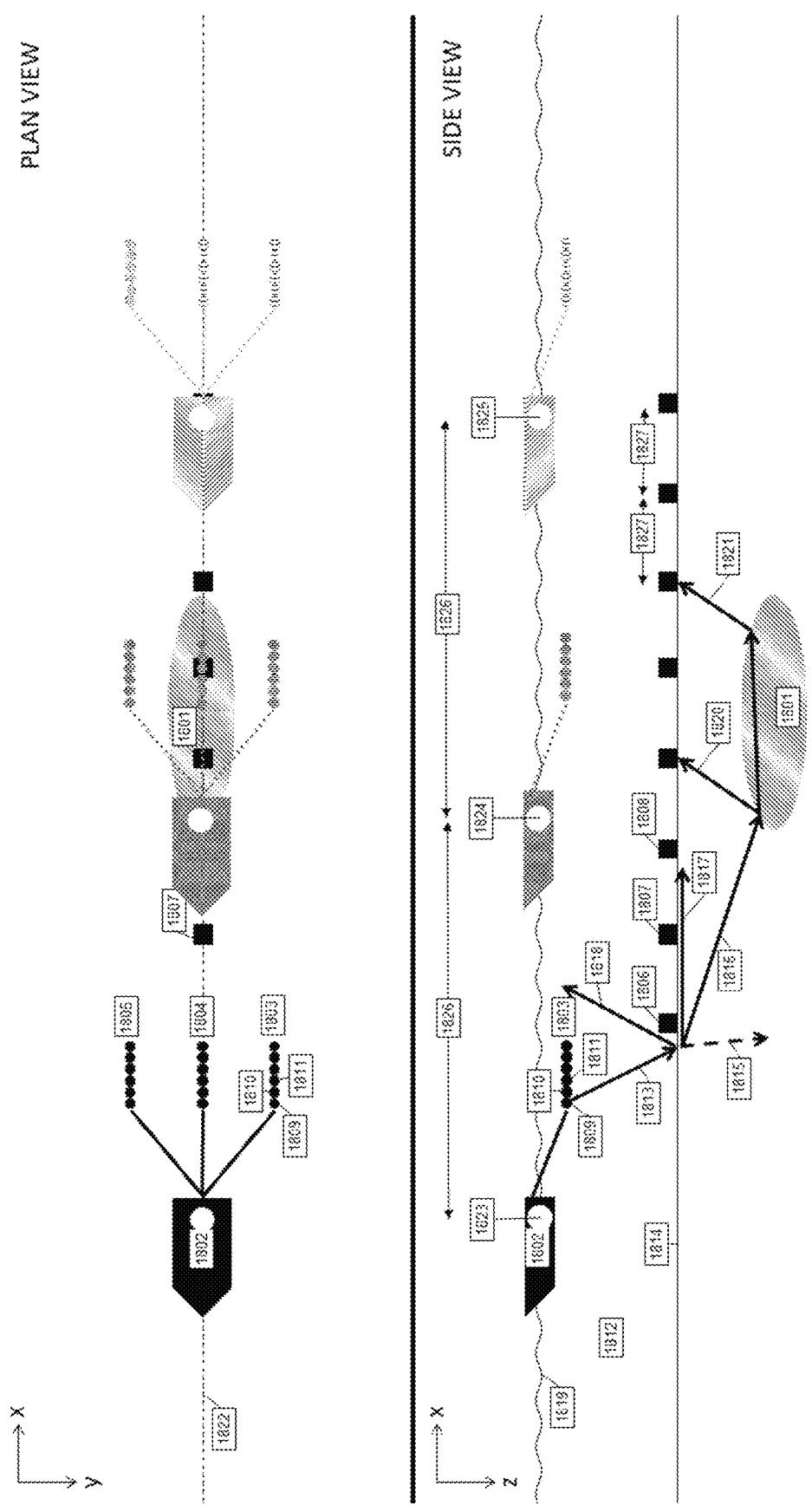
FIG. 18 illustrates the general practice of marine seismic surveying.

The methods described herein facilitate more efficient data acquisition. On the source side, this includes configurations that allow for acquiring data at different source depths, in parallel (simultaneously) or sequentially. FIGS. 15, 16 and 17 illustrate source acquisition configurations, for any type of source, that provide further benefits as will be clear from the descriptions.

In FIG. 15, methods for towing of source arrays at different tow depths but offset to each other are disclosed. Multiple source arrays can be at a single depth level, potentially excited simultaneously. This source configuration or layout is different to existing methods as the simultaneous or near-simultaneous shots of the sources at different tow depths do not interfere with each other, while the encoding methods disclosed herein enable separating the source side ghost. The disclosed configurations constitute an efficient way of acquiring seismic data for some of the methods described herein.

In FIG. 16, various configurations for towing one or more source arrays at varying or alternating tow depths are disclosed, including: (1) Periodically varying, e.g. on a sine or cosine trajectory, (2) Aperiodically varying, and (3) shooting simultaneously or shooting sequentially. The configurations with varying tow depths teach how some of the methods described herein could be acquired efficiently.

In FIG. 17, sub-arrays of a seismic source array that are towed at different depth levels, including at a constant depth and at a periodically or aperiodically varying depth, are shown. These subarrays are excited individually or can be excited in concert with subarrays from other source arrays. This method is different to traditional over/under sources as it does not aim to overcome the source side ghost notch by shooting over/under source sub-arrays simultaneously, but offers an acquisition scheme that can be processed and encoded for separation using the methods described herein. Examples are V-shaped or A-shaped configurations of source sub-arrays.

Receiver Configurations and Types

As mentioned previously, the methods described herein are also applicable to the receiver side. A specific embodiment which enables deghosting data on the receiver side is now presented in more detail. This embodiment exploits the tides that change the physical distance between receivers on the seafloor, the source position and the sea surface. When acquiring seismic data, for instance as part of a time-lapse survey, such changes can be utilized in a similar fashion to described source side deghosting approach, using at least two vintages of seismic data, to deghost the seismic wavefield on the receiver side. This method can also be combined with source-side enabled methods, jointly or sequentially, to provide source-side and receiver-side deghosted seismic data.

Furthermore, periodic and aperiodic modulation functions can directly be imposed on individual receivers through various means to, for instance, have the amplitude strengths varying. Such modulation function, potentially in combination with modulation functions on the source side, can be employed taking advantage of the methods described herein to for instance more efficiently de-alias the data as part of the acquisition and/or seismic processing.

While various embodiments of the present invention have been described above, it should be understood that they have been presented by way of example only, and not of limitation. For example it should be noted that where filtering steps are carried out in the frequency-wavenumber space, filters with the equivalent effect can also be implemented in many other domains such as tau-p or space-time.

In addition, note that although the embodiments have focused on periodic and non-periodic variations in at least one source or source acquisition parameter, the methods described apply equally well to cases where such variations are in the receiver acquisition parameters, as can be understood by applying such principles as source-receiver reciprocity and/or invoking invariance for translation along the horizontal coordinate(s). A particular application in point is that of receiver-side deghosting.

Also note that while some of the methods and embodiments have been described and illustrated by way of two-dimensional theory, processing, data, and/or examples, they can be applied/apply equally to processing of three-dimensional data and, as can be appreciated by someone of ordinary skill in the art, can be generalised to operate with three-dimensional processing on three-dimensional data or even four- or five-dimensional processing by jointly considering simultaneous source data recorded at multiple receivers.

In addition, we note that it can be advantageous to process and separate local subsets of simultaneous source data acquired using the methods and principles described herein. Processing local subsets can further reduce the aliasing ambiguity and improve the separation.

As should be clear to one possessing ordinary skill in the art, the methods described herein apply to different types of wavefield signals recorded (simultaneously or non-simultaneously) using different types of sensors, including but not limited to; pressure and/or one or more components of the particle motion vector (where the motion can be: displacement, velocity, or acceleration) associated with compressional waves propagating in acoustic media and/or shear waves in elastic media. When multiple types of wavefield signals are recorded simultaneously and are or can be assumed (or processed) to be substantially co-located, we speak of so-called "multi-component" measurements and we may refer to the measurements corresponding to each of the different types as a "component". Examples of multi-component measurements are the pressure and vertical component of particle velocity recorded by an ocean bottom cable or node-based seabed seismic sensor, the crossline and vertical component of particle acceleration recorded in a multi-sensor towed-marine seismic streamer, or the three component acceleration recorded by a microelectromechanical system (MEMS) sensor deployed e.g. in a land seismic survey.

The methods described herein can be applied to each of the measured components independently, or to two or more of the measured components jointly. Joint processing may involve processing vectorial or tensorial quantities representing or derived from the multi-component data and may be advantageous as additional features of the signals can be used in the separation. For example, it is well known in the art that particular combinations of types of measurements enable, by exploiting the physics of wave propagation, processing steps whereby e.g. the multi-component signal is separated into contributions propagating in different directions (e.g., wavefield separation), certain spurious reflected waves are eliminated (e.g., deghosting), or waves with a particular (non-linear) polarization are suppressed (e.g., polarization filtering). Thus, the methods described herein may be applied in conjunction with, simultaneously with, or after such processing of two or more of the multiple components.

Furthermore, in case the obtained wavefield signals consist of/comprise one or more components, then it is possible to derive local directional information from one or more of the components and to use this directional information in the reduction of aliasing effects in the separation as described herein in detail.

Further, it should be understood that the various features, aspects and functionality described in one or more of the individual embodiments are not limited in their applicability to the particular embodiment with which they are described, but instead can be applied, alone or in various combinations, to one or more of the other embodiments of the invention.

For example, it is understood that the techniques, methods and systems that are disclosed herein may be applied to all marine, seabed, borehole, land and transition zone seismic surveys, that includes planning, acquisition and processing. This includes for instance time-lapse seismic, permanent reservoir monitoring, VSP and reverse VSP, and instrumented borehole surveys (e.g. distributed acoustic sensing). Moreover, the techniques, methods and systems disclosed herein may also apply to non-seismic surveys that are based on wavefield data to obtain an image of the subsurface.

Figure 19:
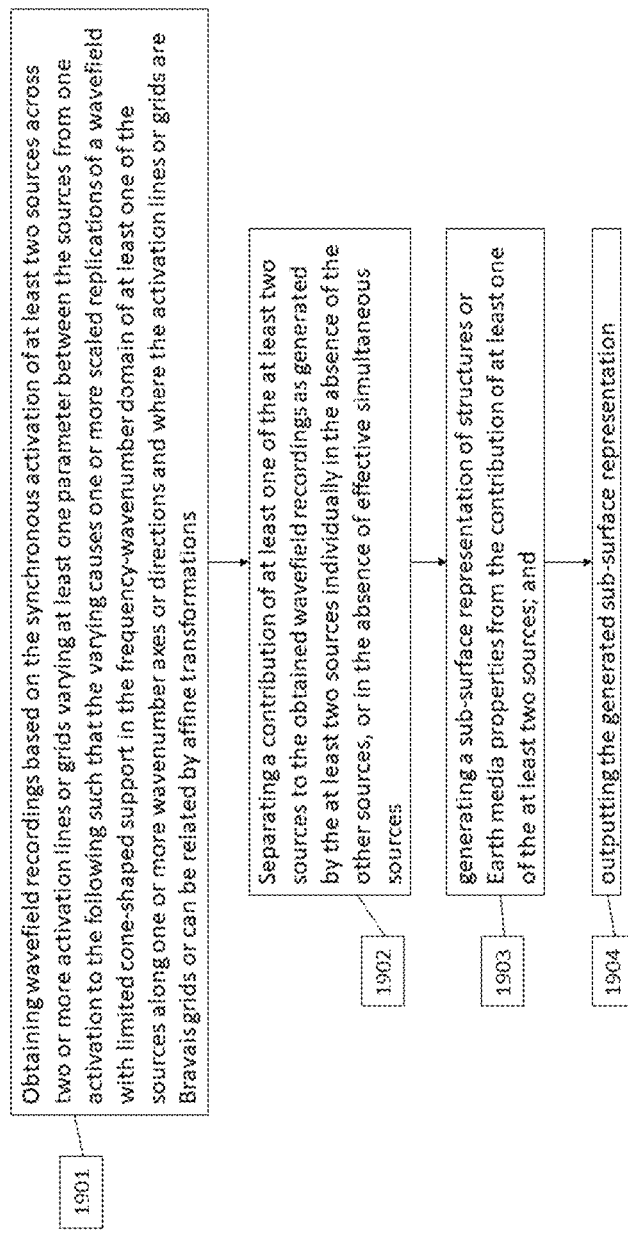
FIG. 19 summarizes key steps in the methods proposed herein in a flowchart.

In FIG. 19, the relation between key steps in the methods proposed herein is summarized. In a first step, 1901, Obtaining wavefield recordings based on the synchronous activation of at least two sources across two or more activation lines or grids varying at least one parameter between the sources from one activation to the following selected from one or more of a group consisting of source signal amplitude, source signal spectrum, source activation time, source location at activation time and source depth, such that the varying causes one or more scaled replications of a wavefield with limited cone-shaped support in the frequency-wavenumber domain of at least one of the sources along one or more wavenumber axes or directions and where the activation lines or grids are Bravais grids or can be related by affine transformations. Then, in a second step, 1902, a contribution is separated of at least one of the at least two sources to the obtained wavefield recordings as generated by the at least two sources individually in the absence of the other sources, or in the absence of effective simultaneous sources. In a third step, 1903, sub-surface representations of structures or Earth media properties are generated from the contribution of at least one of the at least two sources. Finally, in a fourth step, 1904, the generated sub-surface representations are output.

The methods described herein may be understood as a series of logical steps and (or grouped with) corresponding numerical calculations acting on suitable digital representations of the obtained wave field quantities, and hence can be implemented as computer programs or software comprising sequences of machine-readable instructions and compiled code, which, when executed on the computer produce the intended output in a suitable digital representation. More specifically, a computer program can comprise machine-readable instructions to perform the following tasks:

Reading all or part of a suitable digital representation of the obtained wave field quantities into memory from a (local) storage medium (e.g., disk/tape), or from a (remote) network location;

(2) Repeatedly operating on the all or part of the digital representation of the obtained wave field quantities read into memory using a central processing unit (CPU), a (general purpose) graphical processing unit (GPU), or other suitable processor. As already mentioned, such operations may be of a logical nature or of an arithmetic (i.e., computational) nature. Typically the results of many intermediate operations are temporarily held in memory or, in case of memory intensive computations, stored on disk and used for subsequent operations; and (3) Outputting all or part of a suitable digital representation of the results produced when there no further instructions to execute by transferring the results from memory to a (local) storage medium (e.g., disk/tape) or a (remote) network location.

Computer programs may run with or without user interaction, which takes place using input and output devices such as keyboards or a mouse and display. Users can influence the program execution based on intermediate results shown on the display or by entering suitable values for parameters that are required for the program execution. For example, in one embodiment, the user could be prompted to enter information about e.g., the average inline shot point interval or source spacing. Alternatively, such information could be extracted or computed from metadata that are routinely stored with the seismic data, including for example data stored in the so-called headers of each seismic trace.

Figure 20:
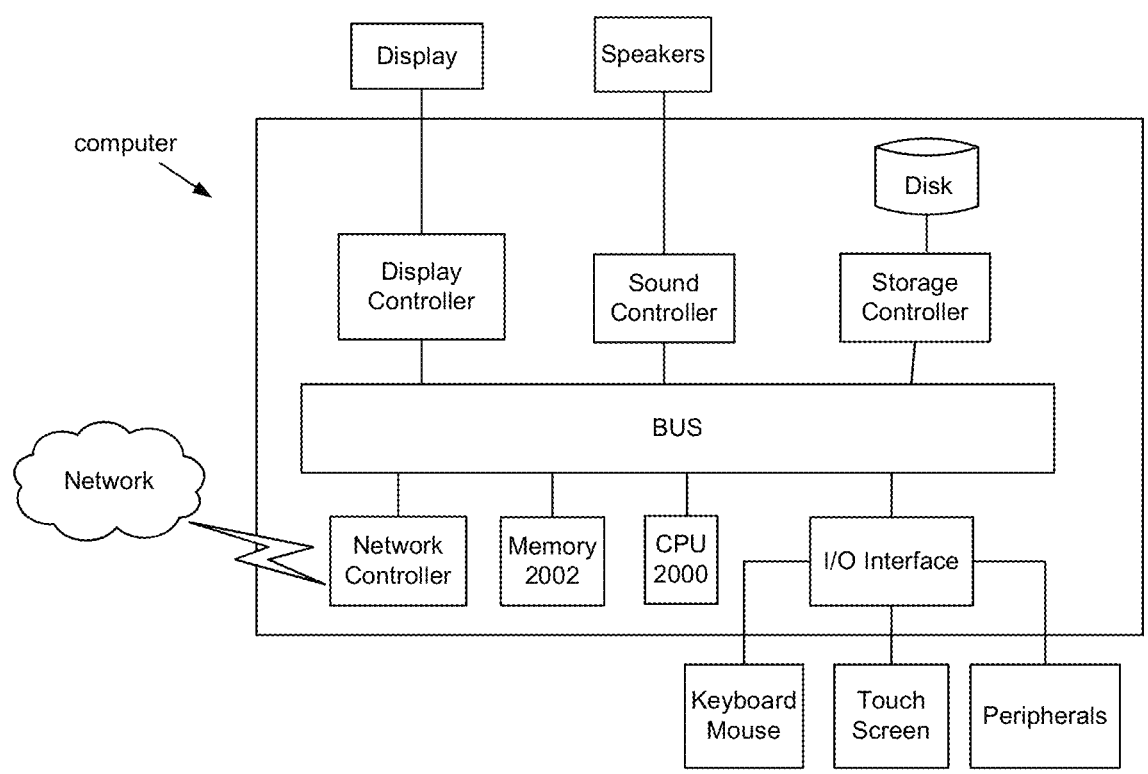
FIG. 20 illustrates hardware components of a computer.

Next, a hardware description of a computer or computers used to perform the functionality of the above-described exemplary embodiments is described with reference to FIG. 20. In FIG. 20, the computer includes a CPU 2000 (an example of "processing circuitry") that performs the processes described above. The process data and instructions may be stored in memory 2002. These processes and instructions may also be stored on a storage medium disk such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which computer communicates, such as a server or another computer.

Further, the claimed advancements may be provided as a utility application, background daemon, or component of an operating system, or combination thereof, executing in conjunction with CPU 2000 and an operating system such as Microsoft Windows 7, UNIX, Solaris, LINUX, Apple MAC-OS and other systems known to those skilled in the art.

The hardware elements in order to achieve the computer can be realized by various circuitry elements, known to those skilled in the art. For example, CPU 2000 can be a Xenon or Core processor from Intel of America or an Opteron processor from AMD of America, or may be other processor types that would be recognized by one of ordinary skill in the art. Alternatively, the CPU 2000 can be implemented on an FPGA, ASIC, PLD or using discrete logic circuits, as one of ordinary skill in the art would recognize. Further, C P U 2000 may be implemented as multiple processors cooperatively working in parallel to perform the instructions of the inventive processes described above.

LIST OF CITED REFERENCES

[Halliday et al., 2014] Halliday and Laws, Seismic acquisition using phase-shifted sweeps: US Patent application US20140278119A1 (2014).

[Shannon, 1949] C. E. Shannon, Proc. Inst. of Radio Eng. 37, 10 (1949).
[Nyquist, 1928] H. Nyquist, Trans. AWE. 47, 617 (1928).
[Ikelle, 2010] L. T. Ikelle, *Coding and Decoding: Seismic Data: The Concept of Multishooting*. (Elsevier, 2010), Vol. 39.
[Abma et al., 2015] R. Abma, D. Howe, M. Foster, I. Ahmed, M. Tanis, Q. Zhang, A. Arogunmati and G. Alexander, Geophysics. 80, WD37 (2015).
[Kumar et al., 2015] R. Kumar, H. Wason and F. J. Hermann, Geophysics. 80, WD73 (2015).
[Mueller et al., 2015] M. B. Mueller, D. F. Halliday, D. J. van Manen and J. O. A. Robertsson, Geophysics. 80, V133 (2015).
[Robertsson, 2015] Robertsson, J. O. A., R. M. Laws, and J. E. Kragh, 2015, Marine seismic methods, in Resources in the near-surface Earth (eds. L. Slater and D. Bercovici), Treatise on Geophysics, $2^{nd}$ edition (ed. G. Schubert), Elsevier-Pergamon, Oxford.
[Bracewell, 1999] R. Bracewell, *The Fourier Transform & Its Applications* (McGraw-Hill Science, 1999).
[Barnes, 1992] A. E. Barnes, GEOPHYSICS, 57(5), 749-751 (1992).
[Stockwell, 1996] R. G. Stockwell, L. Mansinha, and R. P. Lowe. Signal Processing, IEEE Transactions on 44(4), 998-1001 (1996).
[Dragoset, 1995] W. H. Dragoset. Geophysical applications of adaptive-noise cancellation. $65^{th}$ SEG meeting, Houston, USA, Expanded Abstracts, 1389-1392.
[Trickett, 2003] S. R. Trickett, Stretch-free stacking. In 2003 SEG Annual Meeting. Society of Exploration Geophysicists.
[Zhang et al., 2012] B. Zhang, K. Zhang, S. Guo, and K. J. Marfurt, Nonstretching NMO correction of prestack time-migrated gathers using a matching-pursuit algorithm. Geophysics, 78(1), U9-U18 (2012).
[Papoulis, 1977] A. Papoulis, Generalized sampling expansion. Circuits and Systems, IEEE Transactions on 24, no. 11, 652-654 (1977).
[Xu et al., 2005] S. Xu, Y. Zhang, D. Pham, and G. Lambare, Antileakage Fourier transform for seismic data regularization. Geophysics 70, no. 4, V87-V95 (2005).

The invention claimed is:

1. A wavefield acquisition and processing method, comprising:
obtaining wavefield recordings based on synchronous activation of at least two sources across two or more activation lines or activation grids, while varying a parameter of the at least two sources from one activation to a following activation, the parameter being one of source signal amplitude, source signal spectrum, source activation time, source location at activation time, and source depth, such that the varying of the parameter generates a scaled replication of a particular wavefield with limited cone-shaped support in a frequency-wavenumber domain of a particular source of the at least two sources along one or more wavenumber axes or directions, wherein the generated scaled replication overlaps the particular wavefield in the frequency-wavenumber domain;
separating, using information of the varying of the parameter, a contribution of the particular source to the obtained wavefield recordings as generated by the at least two sources individually in absence of the other sources, or in absence of effective simultaneous sources;
generating a sub-surface representation of structures or Earth media properties from the separated contribution of the at least one of the at least two sources; and
outputting the generated sub-surface representation.

2. The method of claim 1, wherein the activation lines or the activation grids are Bravais grids or can be related by affine transformation, and
the method further comprises choosing parameters defining the Bravais grids, the activation lines, the activation grids, or the affine transformations in conjunction with the varying of the parameter, so as to reduce, minimize, or optimize an overlap of the scaled replication with another wavefield due to another source of the at least two sources in the frequency-wavenumber domain, or to improve the separating of the contribution.

3. The method of claim 2, wherein the affine transformations include scaling to reduce the overlap in the frequency-wavenumber domain of the scaled replication of the particular wavefield with the limited cone-shaped support.

4. The method of claim 1, wherein the two or more activation lines or activation grids are hexagonal sampling grids.

5. The method of claim 1, wherein
the two or more activation lines or activation grids are parallel activation lines, and
a distance between activation positions of each of the at least two sources is more than twice as small as a nominal spacing between activation lines in a crossline direction perpendicular to the parallel activation lines.

6. The method of claim 5, where the separating step is performed such that overlapping along a wavenumber axis associated with the crossline direction of the particular wavefield with limited cone-shaped support is reduced, particularly in a temporal frequency band between a temporal aliasing frequency in a perpendicular direction and a lowest frequency for which the scaled replication overlaps the particular wavefield along a wavenumber axis associated with parallel activation lines for which the separating of the contribution completely separates the two or more sources, since the scaled replication does not yet overlap.

7. The method of claim 1, wherein the separating step comprises:
modeling an obtained wavefield recording of the obtained wavefield recordings using a model that incorporates the varying of the parameter to relate representations of the wavefield recording, as generated by the at least two sources individually, in a transform domain, to the obtained wavefield recordings; and
by means of the model, inverting the obtained wavefield recordings to separate the contribution of the particular source to the obtained wavefield recordings.

8. The method of claim 7, wherein the two or more activation lines or activation grids cover at least partially a same subsurface area, and the modelling of the obtained wavefield includes modelling relations between the wavefields as generated by the at least two sources individually.

9. The method of claim 7, where the two or more activation lines or activation grids are staggered with respect to each other, and the modelling includes modelling the obtained wavefield recordings as a superposition of two resampled versions of a single underlying wavefield using exponential phase shift operators.

10. The method of claim 7, where the modelling includes first separating contributions of two wavefields in a limited, low-frequency range, crosscorrelating the separated contributions, and using found shifts to model the obtained wavefield recordings as a superposition of two shifted versions of a single underlying wavefield.

11. The method of claim 1, wherein
the obtained wavefield recordings are obtained for multiple receivers and are locally transformed, and
the separating of the contribution occurs in a multi-dimensional or higher-dimensional transformed space where aliasing ambiguity is reduced.

12. The method of claim 1, wherein the two or more activation lines or activation grids are three-dimensional grids, and wherein each three-dimensional grid traverses a depth or z-coordinate in addition to two lateral coordinates.

13. The method of claim 1, wherein the separating of the contribution is performed after or during imaging/migration.

14. The method of claim 1, wherein the obtained wavefield recordings for overlapping subsets of the synchronously activated at least two sources are processed separately to reduce aliasing ambiguity and improve the separating of the contribution.

15. The method of claim 1, wherein the at least two sources are towed by a single vessel, but a depth of at least one of the at least two sources is varied along the two or more activation lines or activation grids.

16. The method of claim 1, wherein the obtained wavefield recordings include multiple components.

17. The method of claim 16, wherein at least two of the multiple components are combined before one or more products of the combination have a contribution separated.

18. The method of claim 16, wherein the separating step comprises separating a contribution of at least one of the multiple components using local directionality information derived from one of the multiple components other than the at least one of the multiple components.

19. The method of claim 18, further comprising determining the local directionality information jointly from two or more of the multiple components.

20. A wavefield acquisition and processing method, comprising:
obtaining wavefield recordings based on synchronous activation of at least two sources across two or more activation lines or activation grids, while varying a parameter between the at least two sources from one activation to a following activation, the parameter being one of source signal amplitude, source activation time, source location at activation time, and source depth, such that the varying of the parameter generates a scaled replication of a particular wavefield with limited cone-shaped support in a frequency-wavenumber domain of a particular source of the at least two sources along one or more wavenumber axes or directions;
separating, using information of the varying of the parameter, a contribution of the particular source to the obtained wavefield recordings as generated by the at least two sources individually in absence of the other sources, or in absence of effective simultaneous sources;
generating a sub-surface representation of structures or Earth media properties from the separated contribution of the at least one of the at least two sources; and
outputting the generated sub-surface representation.

* * * * *